(12) United States Patent
Myung et al.

(10) Patent No.: US 11,785,639 B2
(45) Date of Patent: Oct. 10, 2023

(54) METHOD AND APPARATUS FOR TRANSMITTING AND RECEIVING SIGNAL IN WIRELESS COMMUNICATION SYSTEM

(71) Applicant: LG Electronics Inc., Seoul (KR)

(72) Inventors: Sechang Myung, Seoul (KR);
Seonwook Kim, Seoul (KR); Suckchel Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 170 days.

(21) Appl. No.: 17/032,127

(22) Filed: Sep. 25, 2020

(65) Prior Publication Data

US 2021/0100030 A1    Apr. 1, 2021

Related U.S. Application Data

(60) Provisional application No. 62/911,114, filed on Oct. 4, 2019.

(30) Foreign Application Priority Data

Sep. 26, 2019   (KR) .................... 10-2019-0119157
Nov. 7, 2019    (KR) .................... 10-2019-0141904

(51) Int. Cl.
*H04W 74/08* (2009.01)
(52) U.S. Cl.
CPC ... *H04W 74/0808* (2013.01); *H04W 74/0833* (2013.01)
(58) Field of Classification Search
CPC ......... H04W 74/0808; H04W 74/0833; H04W 74/006; H04W 74/008; H04W 74/002; H04W 74/08; H04W 74/0816; H04W 74/0841; H04W 74/085; H04W 4/40; H04W 4/42; H04W 4/44; H04W 4/46; H04W 4/48; H04W 4/70; H04W 4/80;
(Continued)

(56) References Cited

U.S. PATENT DOCUMENTS

2017/0230986 A1\*  8/2017  Moon ................... H04L 5/14
2017/0231006 A1\*  8/2017  Yin ................. H04W 72/0446
(Continued)

FOREIGN PATENT DOCUMENTS

WO    WO2020027533    \*  2/2020
WO    WO2020215330    \* 10/2020

*Primary Examiner* — Sudesh M Patidar
(74) *Attorney, Agent, or Firm* — BRYAN CAVE LEIGHTON PAISNER LLP

(57) ABSTRACT

The present disclosure discloses a method of a user equipment (UE) in a wireless communication system. Especially, the method comprising: receiving system information; performing a channel access procedure (CAP) based on one of a first channel access mode and a second channel access mode different from the first channel access mode; and transmitting an uplink signal based on a result of the CAP, and wherein, based on the system information including information related to a channel access mode, the CAP is performed based on one of the first channel access mode and the second channel access mode based on the information, and wherein, based on the system information not including the information related to the channel access mode, the CAP is performed based on the first channel access mode.

10 Claims, 17 Drawing Sheets

(58) Field of Classification Search
CPC ........ G16Y 10/40; G16Y 40/10; G16Y 40/30;
G16Y 40/35; G16Y 40/40; G16Y 40/50;
G16Y 40/60; B60R 2300/00
See application file for complete search history.

(56) References Cited

U.S. PATENT DOCUMENTS

| | | | |
|---|---|---|---|
| 2019/0132882 A1* | 5/2019 | Li | H04L 27/2605 |
| 2019/0349998 A1* | 11/2019 | Bhattad | H04L 5/0016 |
| 2020/0053798 A1* | 2/2020 | Tsai | H04W 74/006 |
| 2021/0105801 A1* | 4/2021 | Shimezawa | H04W 72/04 |
| 2021/0120583 A1* | 4/2021 | Wang | H04W 74/0816 |
| 2021/0298072 A1* | 9/2021 | Oh | H04W 72/0446 |

* cited by examiner (a) Uplink Tx procedure based on dynamic grant    (b) Uplink Tx procedure based on configured grant FIG. 7
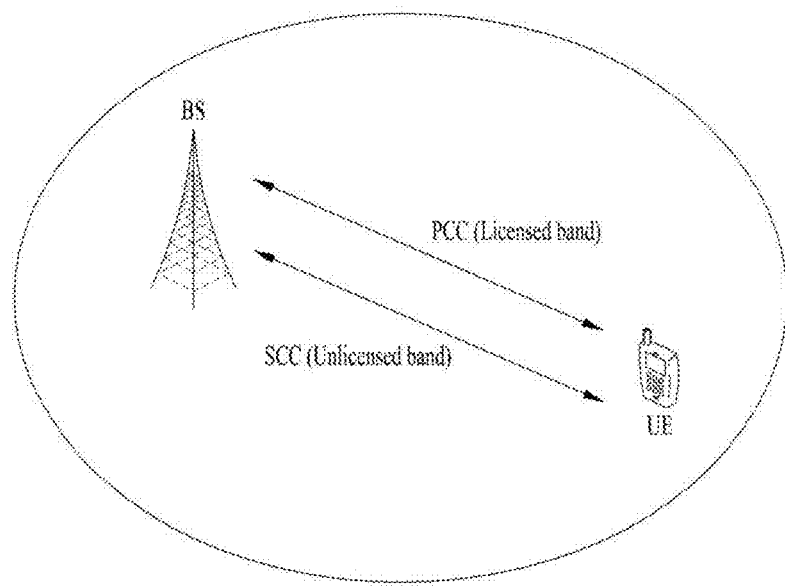
(a) Carrier aggregation between L-band and U-band
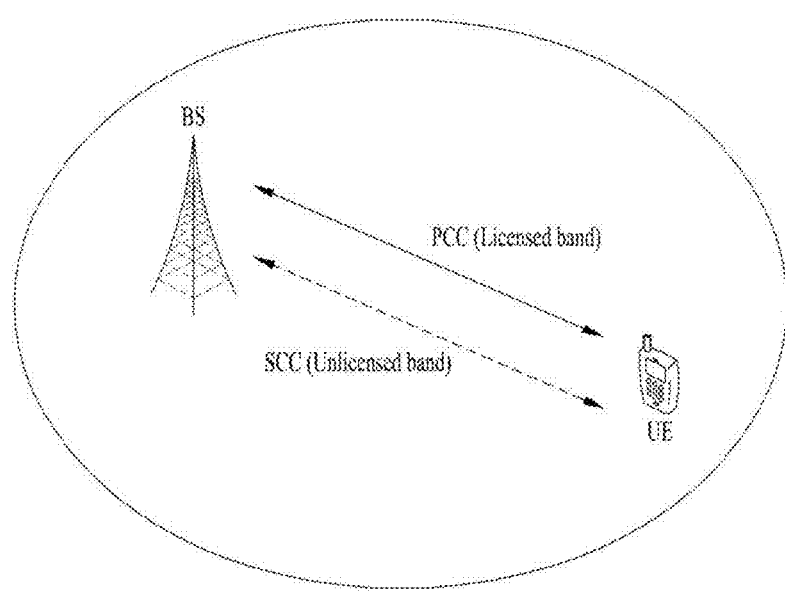
(b) Standalone U-band(s)

METHOD AND APPARATUS FOR TRANSMITTING AND RECEIVING SIGNAL IN WIRELESS COMMUNICATION SYSTEM

TECHNICAL FIELD

The present disclosure relates to a method and apparatus for transmitting and receiving a signal in a wireless communication system.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

DISCLOSURE

Technical Problem

Provided are a method and apparatus for efficiently performing a wireless signal transmission and reception procedure.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In one aspect of the present disclosure, a method of a user equipment (UE) in a wireless communication system includes receiving system information, acquiring a channel access mode based on the system information, performing a channel access procedure (CAP) based on the channel access mode, and transmitting an uplink signal based on a result of the CAP. The channel access mode includes a first mode and a second mode, a CAP type of the first mode is difference from a CAP type of the second mode, and the acquired channel access mode is i) a channel access mode indicated by the system information between the first mode and the second mode based on the system information including information about the channel access mode, or ii) the first mode based on the system information not including the information about the channel access mode.

In another aspect of the present disclosure, a UE in a wireless communication system includes at least one transceiver, at least one processor, and at least one computer memory operatively coupled to the at least one transceiver and at least one processor and, when executed, causing the at least one transceiver and at least one processor to perform operations. The operations include receiving system information, acquiring a channel access mode based on the system information, performing a CAP based on the channel access mode, and transmitting an uplink signal based on a result of the CAP. The channel access mode includes a first mode and a second mode, a CAP type of the first mode is difference from a CAP type of the second mode, and the acquired channel access mode is i) a channel access mode indicated by the system information between the first mode and the second mode based on the system information including information about the channel access mode, or ii) the first mode based on the system information not including the information about the channel access mode.

In another aspect of the present disclosure, an apparatus for a UE includes at least one processor, and at least one computer memory operatively coupled to the at least one processor and, when executed, causing the at least one processor to perform operations. The operations include receiving system information, acquiring a channel access mode based on the system information, performing a CAP based on the channel access mode, and transmitting an uplink signal based on a result of the CAP. The channel access mode includes a first mode and a second mode, a CAP type of the first mode is difference from a CAP type of the second mode, and the acquired channel access mode is i) a channel access mode indicated by the system information between the first mode and the second mode based on the system information including information about the channel access mode, or ii) the first mode based on the system information not including the information about the channel access mode.

In another aspect of the present disclosure, a processor-readable medium stores one or more instructions which, when executed, cause at least one processor to perform operations. The operations include receiving system information, acquiring a channel access mode based on the system information, performing a CAP based on the channel access mode, and transmitting an uplink signal based on a result of the CAP. The channel access mode includes a first mode and a second mode, a CAP type of the first mode is difference from a CAP type of the second mode, and the acquired channel access mode is i) a channel access mode indicated by the system information between the first mode and the second mode based on the system information including information about the channel access mode, or ii) the first mode based on the system information not including the information about the channel access mode.

The CAP type of the first mode may include a random backoff-based CAP.

The second mode may be a mode in which the CAP and the signal transmission are performed in a period of a specific length based on a structure of periodically repeating the period of the specific length.

The CAP type of the first mode may further include a CAP in which it is determined whether a channel is idle during a predetermined first time period, and the CAP type of the second mode may be a CAP in which it is determined whether a channel is idle for a predetermined second time period.

The length of the first time period may be larger than the length of the second time period.

The second time period may be included in the period of the specific length.

The UL signal may include a physical random access channel (PRACH), and based on an RACH occasion (RO) being configured as a boundary of the period of the specific length, the PRACH may be transmitted in the RO based on the result of the CAP regardless of whether a downlink signal has been detected in the period of the specific length.

The uplink signal may include an uplink signal not requiring an uplink grant, the period of the specific length is configured for each of a base station (BS) and the UE, and the uplink signal may be transmitted in the period of the specific length based on the result of the CAP, based on a downlink signal not being received in the period of the specific length configured for the UE.

The uplink signal may be transmitted in an unlicensed band.

An apparatus applied to an embodiment of the present disclosure may include an autonomous driving vehicle.

The above-describe aspects of the present disclosure are merely a part of preferred embodiments of the present disclosure, and those skilled in the art will derive and understand various embodiments reflecting technical features of the present disclosure based on the following detailed description of the present disclosure.

Advantageous Effects

According to embodiments of the present disclosure, a signal may be efficiently transmitted and received in a wireless communication system.

According to embodiments of the present disclosure, an efficient signal transmission method considering the characteristics of an unlicensed band is provided.

According to embodiments of the present disclosure, information about a channel access mode supported in an unlicensed band may be efficiently acquired.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

The accompanying drawings, which are included to provide a further understanding of the disclosure, illustrate embodiments of the disclosure and together with the description serve to explain the principle of the disclosure.

In the drawings:

FIG. 7 illustrates a wireless communication system supporting an unlicensed band;

BEST MODE

The following technology may be used in various wireless access systems such as code division multiple access (CDMA), frequency division multiple access (FDMA), time division multiple access (TDMA), orthogonal frequency division multiple access (OFDMA), single carrier frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as institute of electrical and electronics engineers (IEEE) 802.11 (wireless fidelity (Wi-Fi)), IEEE 802.16 (worldwide interoperability for microwave access (WiMAX)), IEEE 802.20, evolved UTRA (E-UTRA), and so on. UTRA is a part of universal mobile telecommunications system (UMTS). $3^{rd}$ generation partnership project (3GPP) long term evolution (LTE) is a part of evolved UMTS (E-UMTS) using E-UTRA, and LTE-advanced (LTE-A) is an evolution of 3GPP LTE. 3GPP new radio or new radio access technology (NR) is an evolved version of 3GPP LTE/LTE-A.

As more and more communication devices require larger communication capacities, the need for enhanced mobile broadband communication relative to the legacy radio access technologies (RATs) has emerged. Massive machine type communication (MTC) providing various services to inter-connected multiple devices and things at any time in any place is one of significant issues to be addressed for next-generation communication. A communication system design in which services sensitive to reliability and latency are considered is under discussion as well. As such, the introduction of the next-generation radio access technology (RAT) for enhanced mobile broadband communication (eMBB), massive MTC (mMTC), and ultra-reliable and low latency communication (URLLC) is being discussed. For convenience, this technology is called NR or New RAT in the present disclosure.

While the following description is given in the context of a 3GPP communication system (e.g., NR) for clarity, the technical spirit of the present disclosure is not limited to the 3GPP communication system. For the background art, terms, and abbreviations used in the present disclosure, refer to the technical specifications published before the present disclosure (e.g., 38.211, 38.212, 38.213, 38.214, 38.300, 38.331, and so on).

In a wireless access system, a user equipment (UE) receives information from a base station (BS) on DL and transmits information to the BS on UL. The information transmitted and received between the UE and the BS includes general data and various types of control information. There are many physical channels according to the types/usages of information transmitted and received between the BS and the UE.

Figure 1:
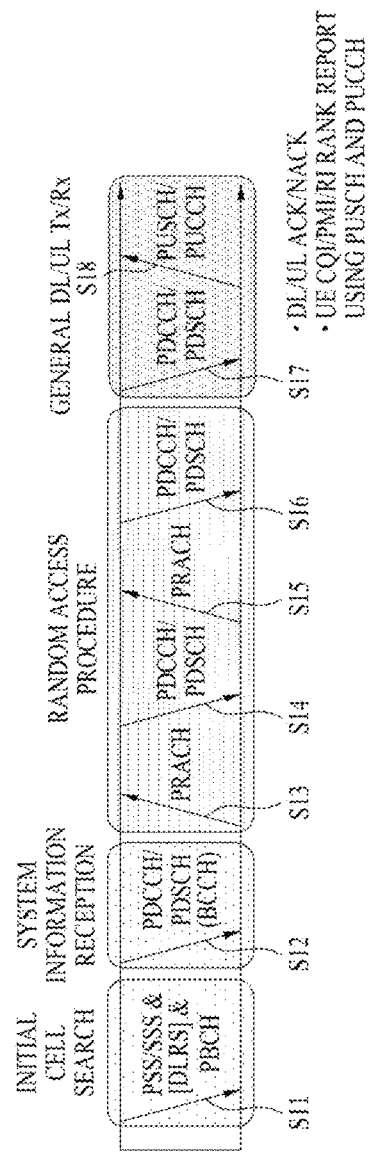
FIG. 1 illustrates physical channels and a general signal transmission method using the physical channels in a $3^{rd}$ generation partnership project (3GPP) system as an exemplary wireless communication system.

FIG. 1 illustrates physical channels and a general signal transmission method using the physical channels in a 3GPP system.

When a UE is powered on or enters a new cell, the UE performs initial cell search (S11). The initial cell search involves acquisition of synchronization to a BS. For this purpose, the UE receives a synchronization signal block (SSB) from the BS. The SSB includes a primary synchronization signal (PSS), a secondary synchronization signal (SSS), and a physical broadcast channel (PBCH). The UE synchronizes its timing to the BS and acquires information such as a cell identifier (ID) based on the PSS/SSS. Further, the UE may acquire information broadcast in the cell by receiving the PBCH from the BS. During the initial cell search, the UE may also monitor a DL channel state by receiving a downlink reference signal (DL RS).

After the initial cell search, the UE may acquire more detailed system information by receiving a physical downlink control channel (PDCCH) and a physical downlink shared channel (PDSCH) corresponding to the PDCCH (S12).

Subsequently, to complete connection to the BS, the UE may perform a random access procedure with the BS (S13 to S16). Specifically, the UE may transmit a preamble on a physical random access channel (PRACH) (S13) and may receive a PDCCH and a random access response (RAR) for the preamble on a PDSCH corresponding to the PDCCH (S14). The UE may then transmit a physical uplink shared channel (PUSCH) by using scheduling information in the RAR (S15), and perform a contention resolution procedure including reception of a PDCCH and a PDSCH signal corresponding to the PDCCH (S16).

When the random access procedure is performed in two steps, steps S13 and S15 may be performed as one step (in which Message A is transmitted by the UE), and steps S14 and S16 may be performed as one step (in which Message B is transmitted by the BS).

After the above procedure, the UE may receive a PDCCH and/or a PDSCH from the BS (S17) and transmit a physical uplink shared channel (PUSCH) and/or a physical uplink control channel (PUCCH) to the BS (S18), in a general UL/DL signal transmission procedure. Control information that the UE transmits to the BS is generically called uplink control information (UCI). The UCI includes a hybrid automatic repeat and request acknowledgement/negative acknowledgement (HARQ-ACK/NACK), a scheduling request (SR), channel state information (CSI), and so on. The CSI includes a channel quality indicator (CQI), a precoding matrix index (PMI), a rank indication (RI), and so on. In general, UCI is transmitted on a PUCCH. However, if control information and data should be transmitted simultaneously, the control information and the data may be transmitted on a PUSCH. In addition, the UE may transmit the UCI aperiodically on the PUSCH, upon receipt of a request/command from a network.

Figure 2:
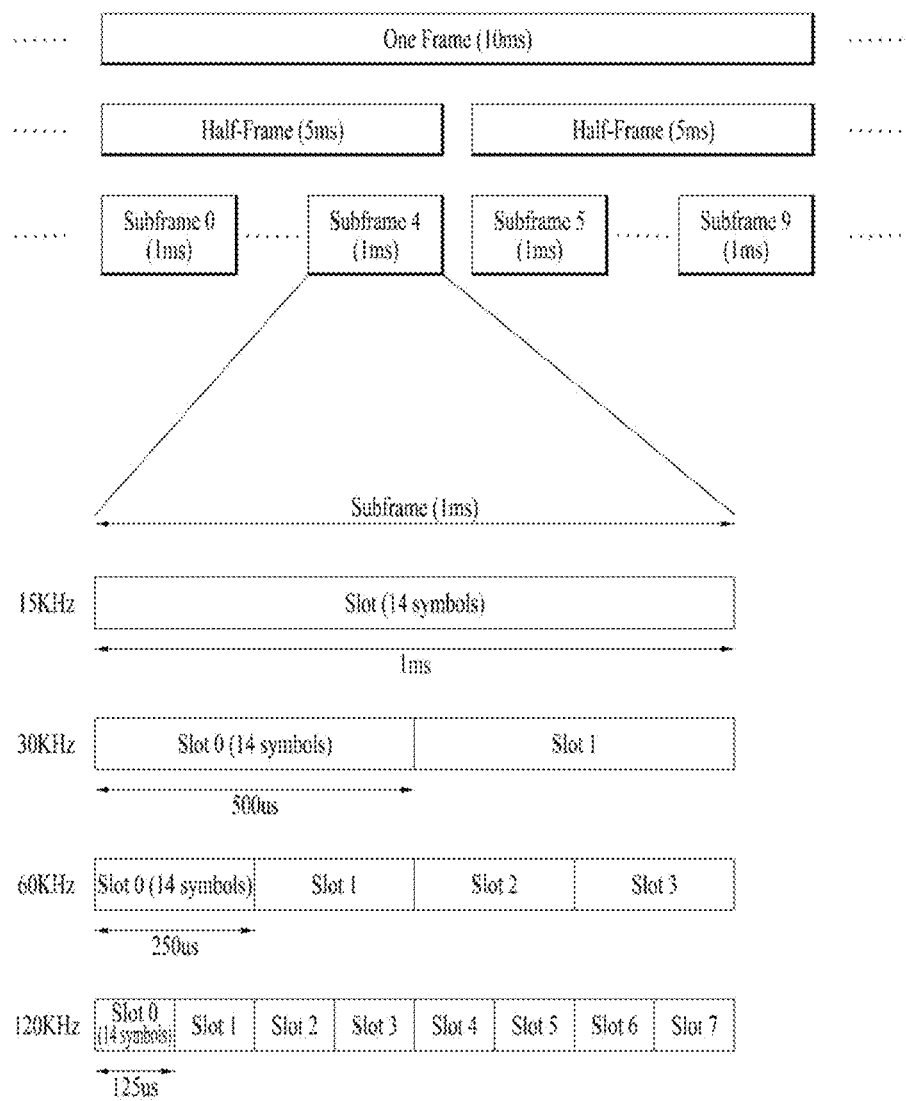
FIG. 2 illustrates a radio frame structure.

FIG. 2 illustrates a radio frame structure.

In NR, UL and DL transmissions are configured in frames. Each radio frame has a length of 10 ms and is divided into two 5-ms half-frames. Each half-frame is divided into five 1-ms subframes. A subframe is divided into one or more slots, and the number of slots in a subframe depends on a subcarrier spacing (SCS). Each slot includes 12 or 14 OFDM(A) symbols according to a cyclic prefix (CP). When a normal CP is used, each slot includes 14 OFDM symbols. When an extended CP is used, each slot includes 12 OFDM symbols. A symbol may include an OFDM symbol (or a CP-OFDM symbol) and an SC-FDMA symbol (or a discrete Fourier transform-spread-OFDM (DFT-s-OFDM) symbol).

Table 1 exemplarily illustrates that the number of symbols per slot, the number of slots per frame, and the number of slots per subframe vary according to SCSs in a normal CP case.

TABLE 1

| SCS (15*2^u) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

*$N^{slot}_{symb}$: number of symbols in a slot
*$N^{frame, u}_{slot}$: number of slots in a frame
*$N^{subframe, u}_{slot}$: number of slots in a subframe Table 2 illustrates that the number of symbols per slot, the number of slots per frame, and the number of slots per subframe vary according to SCSs in an extended CP case.

TABLE 2

| SCS (15*2^u) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

The frame structure is merely an example, and the number of subframes, the number of slots, and the number of symbols in a frame may be changed in various manners.

In the NR system, different OFDM(A) numerologies (e.g., SCSs, CP lengths, and so on) may be configured for a plurality of cells aggregated for one UE. Accordingly, the (absolute time) duration of a time resource (e.g., a subframe, a slot, or a transmission time interval (TTI)) (for convenience, referred to as a time unit (TU)) composed of the same number of symbols may be configured differently between the aggregated cells.

In NR, various numerologies (or SCSs) may be supported to support various 5th generation (5G) services. For example, with an SCS of 15 kHz, a wide area in traditional cellular bands may be supported, while with an SCS of 30 kHz or 60 kHz, a dense urban area, a lower latency, and a wide carrier bandwidth may be supported. With an SCS of 60 kHz or higher, a bandwidth larger than 24.25 kHz may be supported to overcome phase noise.

An NR frequency band may be defined by two types of frequency ranges, FR1 and FR2. 1-R1 and FR2 may be configured as described in Table 3 below. FR2 may be millimeter wave (mmW).

TABLE 3

| Frequency Range designation | Corresponding frequency range | Subcarrier Spacing |
|---|---|---|
| FR1 | 450 MHz-7125 MHz | 15, 30, 60 kHz |
| FR2 | 24250 MHz-52600 MHz | 60, 120, 240 kHz |

Figure 3:
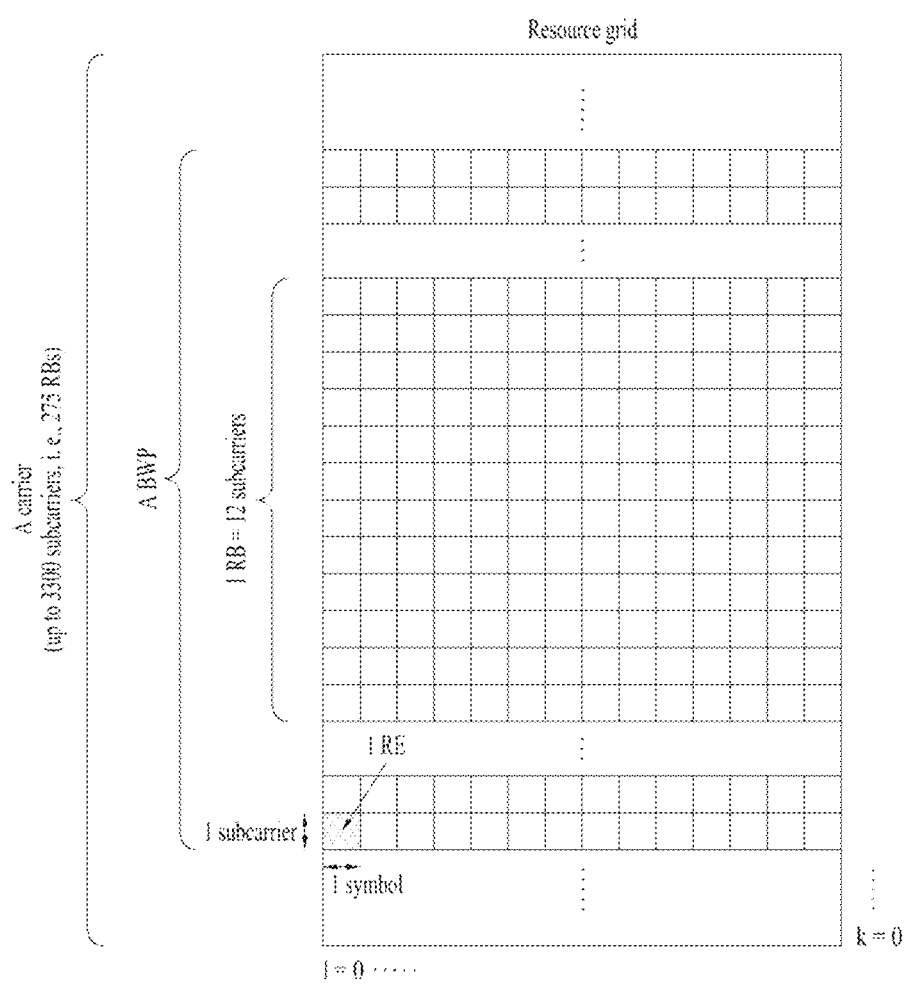
FIG. 3 illustrates a resource grid during the duration of a slot.

FIG. 3 illustrates a resource grid during the duration of one slot.

A slot includes a plurality of symbols in the time domain. For example, one slot includes 14 symbols in a normal CP case and 12 symbols in an extended CP case. A carrier includes a plurality of subcarriers in the frequency domain. A resource block (RB) may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, and so on). A carrier may include up to N (e.g., 5) BWPs. Data communication may be conducted in an active BWP, and only one BWP may be activated for one UE. Each element in a resource grid may be referred to as a resource element (RE), to which one complex symbol may be mapped.

Figure 4:
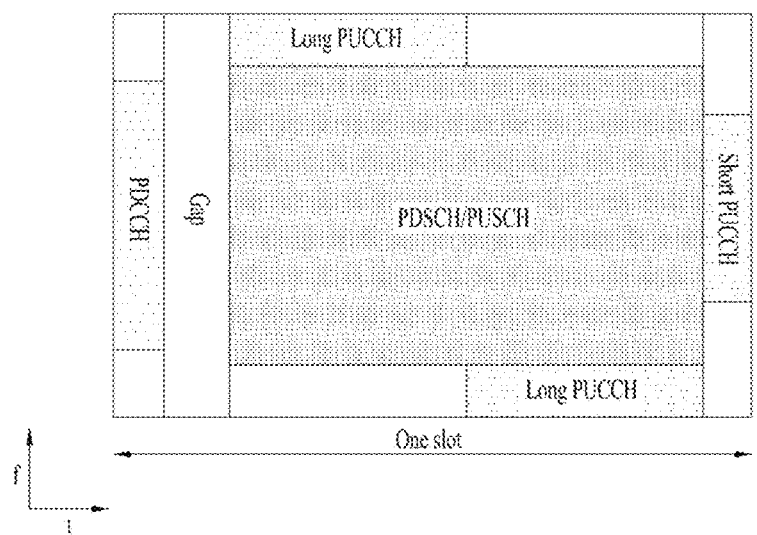
FIG. 4 illustrates exemplary mapping of physical channels in a slot.

FIG. 4 illustrates exemplary mapping of physical channels in a slot.

A DL control channel, DL or UL data, and a UL control channel may all be included in one slot. For example, the first N symbols (hereinafter, referred to as a DL control region) in a slot may be used to transmit a DL control channel, and the last M symbols (hereinafter, referred to as a UL control region) in the slot may be used to transmit a UL control channel. N and M are integers equal to or greater than 0. A resource region (hereinafter, referred to as a data region) between the DL control region and the UL control region may be used for DL data transmission or UL data transmission. A time gap for DL-to-UL or UL-to-DL switching may be defined between a control region and the data region. A PDCCH may be transmitted in the DL control region, and a PDSCH may be transmitted in the DL data region. Some symbols at the time of switching from DL to UL in a slot may be configured as the time gap.

Now, a detailed description will be given of physical channels.

The PDSCH delivers DL data (e.g., a downlink shared channel (DL-SCH) transport block (TB)) and adopts a modulation scheme such as quadrature phase shift keying (QPSK), 16-ary quadrature amplitude modulation (16 QAM), 64-ary QAM (64 QAM), or 256-ary QAM (256 QAM). A TB is encoded to a codeword. The PDSCH may deliver up to two codewords. The codewords are individually subjected to scrambling and modulation mapping, and modulation symbols from each codeword are mapped to one or more layers. An OFDM signal is generated by mapping each layer together with a DMRS to resources, and transmitted through a corresponding antenna port.

The PDCCH delivers DCI. For example, the PDCCH (i.e., DCI) may carry information about a transport format and resource allocation of a DL shared channel (DL-SCH), resource allocation information of an uplink shared channel (UL-SCH), paging information on a paging channel (PCH), system information on the DL-SCH, information on resource allocation of a higher-layer control message such as an RAR transmitted on a PDSCH, a transmit power control command, information about activation/release of configured scheduling, and so on. The DCI includes a cyclic redundancy check (CRC). The CRC is masked with various identifiers (IDs) (e.g. a radio network temporary identifier (RNTI)) according to an owner or usage of the PDCCH. For example, if the PDCCH is for a specific UE, the CRC is masked by a UE ID (e.g., cell-RNTI (C-RNTI)). If the PDCCH is for a paging message, the CRC is masked by a paging-RNTI (P-RNTI). If the PDCCH is for system information (e.g., a system information block (SIB)), the CRC is masked by a system information RNTI (SI-RNTI). When the PDCCH is for an RAR, the CRC is masked by a random access-RNTI (RA-RNTI).

The PDCCH uses a fixed modulation scheme (e.g., QPSK). One PDCCH includes 1, 2, 4, 8, or 16 control channel elements (CCEs) according to its aggregation level (AL). One CCE includes 6 resource element groups (REGs), each REG being defined by one OFDM symbol by one (P)RB.

The PDCCH is transmitted in a control resource set (CORESET). The CORESET corresponds to a set of physical resources/parameters used to deliver the PDCCH/DCI in a BWP. For example, the CORESET is defined as a set of REGs with a given numerology (e.g., an SCS, a CP length, or the like). The CORESET may be configured by system information (e.g., a master information block (MIB)) or UE-specific higher-layer signaling (e.g., RRC signaling). For example, the following parameters/information may be used to configure a CORESET, and a plurality of CORESETs may overlap with each other in the time/frequency domain.

controlResourceSetId: indicates the ID of a CORESET.

frequencyDomainResources: indicates the frequency area resources of the CORESET. The frequency area resources are indicated by a bitmap, and each bit of the bitmap corresponds to an RB group (i.e., six consecutive RBs). For example, the most significant bit (MSB) of the bitmap corresponds to the first RB group of a BWP. An RB group corresponding to a bit set to 1 is allocated as frequency area resources of the CORESET.

duration: indicates the time area resources of the CORESET. It indicates the number of consecutive OFDMA symbols in the CORESET. For example, the duration is set to one of 1 to 3.

cce-REG-MappingType: indicates a CCE-to-REG mapping type. An interleaved type and a non-interleaved type are supported.

precoderGranularity: indicates a precoder granularity in the frequency domain.

tci-StatesPDCCH: provides information indicating a transmission configuration indication (TCI) state for the PDCCH (e.g., TCI-StateID). The TCI state is used to provide the quasi-co-location relation between DL RS(s) in an RS set (TCI-state) and PDCCH DMRS ports.

tci-PresentInDCI: indicates whether a TCI field is included in DCI.

pdcch-DMRS-ScramblingID: provides information used for initialization of a PDCCH DMRS scrambling sequence.

To receive the PDCCH, the UE may monitor (e.g., blind-decode) a set of PDCCH candidates in the CORESET. The PDCCH candidates are CCE(s) that the UE monitors for PDCCH reception/detection. The PDCCH monitoring may be performed in one or more CORESETs in an active DL BWP on each active cell configured with PDCCH monitoring. A set of PDCCH candidates monitored by the UE is defined as a PDCCH search space (SS) set. The SS set may be a common search space (CSS) set or a UE-specific search space (USS) set.

Table 4 lists exemplary PDCCH SSs.

TABLE 4

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| UE Specific | UE Specific | C-RNTI, or MCS-C-RNTI, or CS-RNTI(s) | User specific PDSCH decoding |

The SS set may be configured by system information (e.g., MIB) or UE-specific higher-layer (e.g., RRC) signaling. S or fewer SS sets may be configured in each DL BWP of a serving cell. For example, the following parameters/information may be provided for each SS set. Each SS set may be associated with one CORESET, and each CORESET configuration may be associated with one or more SS sets.

- searchSpaceId: indicates the ID of the SS set.
- controlResourceSetId: indicates a CORESET associated with the SS set.
- monitoringSlotPeriodicityAndOffset: indicates a PDCCH monitoring periodicity (in slots) and a PDCCH monitoring offset (in slots).
- monitoringSymbolsWithinSlot: indicates the first OFDMA symbol(s) for PDCCH monitoring in a slot configured with PDCCH monitoring. The OFDMA symbols are indicated by a bitmap and each bit of the bitmap corresponds to one OFDM symbol in the slot. The MSB of the bitmap corresponds to the first OFDM symbol of the slot. OFDMA symbol(s) corresponding to bit(s) set to 1 corresponds to the first symbol(s) of the CORESET in the slot.
- nrofCandidates: indicates the number of PDCCH candidates (e.g., one of 0, 1, 2, 3, 4, 5, 6, and 8) for each AL={1, 2, 4, 8, 16}.
- searchSpaceType: indicates whether the SS type is CSS or USS.
- DCI format: indicates the DCI format of PDCCH candidates The UE may monitor PDCCH candidates in one or more SS sets in a slot based on a CORESET/SS set configuration. An occasion (e.g., time/frequency resources) in which the PDCCH candidates should be monitored is defined as a PDCCH (monitoring) occasion. One or more PDCCH (monitoring) occasions may be configured in a slot.

Table 5 illustrates exemplary DCI formats transmitted on the PDCCH.

TABLE 5

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |

TABLE 5-continued

| DCI format | Usage |
|---|---|
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or DL scheduling information. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to a corresponding group of UEs on a group common PDCCH which is a PDCCH directed to a group of UEs.

DCI format 0_0 and DCI format 1_0 may be referred to as fallback DCI formats, whereas DCI format 0_1 and DCI format 1_1 may be referred to as non-fallback DCI formats. In the fallback DCI formats, a DCI size/field configuration is maintained to be the same irrespective of a UE configuration. In contrast, the DCI size/field configuration varies depending on a UE configuration in the non-fallback DCI formats.

The PUCCH delivers uplink control information (UCI). The UCI includes the following information.

- SR: information used to request UL-SCH resources.
- HARQ-ACK: a response to a DL data packet (e.g., codeword) on the PDSCH. An HARQ-ACK indicates whether the DL data packet has been successfully received. In response to a single codeword, a 1-bit of HARQ-ACK may be transmitted. In response to two codewords, a 2-bit HARQ-ACK may be transmitted. The HARQ-ACK response includes positive ACK (simply, ACK), negative ACK (NACK), discontinuous transmission (DTX) or NACK/DTX. The term HARQ-ACK is interchangeably used with HARQ ACK/NACK and ACK/NACK.
- CSI: feedback information for a DL channel Multiple input multiple output (MIMO)-related feedback information includes an RI and a PMI.

Table 6 illustrates exemplary PUCCH formats. PUCCH formats may be divided into short PUCCHs (Formats 0 and 2) and long PUCCHs (Formats 1, 3, and 4) based on PUCCH transmission durations.

TABLE 6

| PUCCH format | Length in OFDM symbols $N_{symb}^{PUCCI}$ | Number of bits | Usage | Etc |
|---|---|---|---|---|
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

PUCCH format 0 conveys UCI of up to 2 bits and is mapped in a sequence-based manner, for transmission. Specifically, the UE transmits specific UCI to the BS by transmitting one of a plurality of sequences on a PUCCH of PUCCH format 0. Only when the UE transmits a positive SR, the UE transmits the PUCCH of PUCCH format 0 in PUCCH resources for a corresponding SR configuration.

PUCCH format 1 conveys UCI of up to 2 bits and modulation symbols of the UCI are spread with an orthogonal cover code (OCC) (which is configured differently whether frequency hopping is performed) in the time domain. The DMRS is transmitted in a symbol in which a modulation symbol is not transmitted (i.e., transmitted in time division multiplexing (TDM)).

PUCCH format 2 conveys UCI of more than 2 bits and modulation symbols of the DCI are transmitted in frequency division multiplexing (FDM) with the DMRS. The DMRS is located in symbols #1, #4, #7, and #10 of a given RB with a density of 1/3. A pseudo noise (PN) sequence is used for a DMRS sequence. For 2-symbol PUCCH format 2, frequency hopping may be activated.

PUCCH format 3 does not support UE multiplexing in the same PRBS, and conveys UCI of more than 2 bits. In other words, PUCCH resources of PUCCH format 3 do not include an OCC. Modulation symbols are transmitted in TDM with the DMRS.

PUCCH format 4 supports multiplexing of up to 4 UEs in the same PRBS, and conveys UCI of more than 2 bits. In other words, PUCCH resources of PUCCH format 3 include an OCC. Modulation symbols are transmitted in TDM with the DMRS.

The PUSCH delivers UL data (e.g., UL-shared channel transport block (UL-SCH TB)) and/or UCI based on a CP-OFDM waveform or a DFT-s-OFDM waveform. When the PUSCH is transmitted in the DFT-s-OFDM waveform, the UE transmits the PUSCH by transform precoding. For example, when transform precoding is impossible (e.g., disabled), the UE may transmit the PUSCH in the CP-OFDM waveform, while when transform precoding is possible (e.g., enabled), the UE may transmit the PUSCH in the CP-OFDM or DFT-s-OFDM waveform. A PUSCH transmission may be dynamically scheduled by a UL grant in DCI, or semi-statically scheduled by higher-layer (e.g., RRC) signaling (and/or Layer 1 (L1) signaling such as a PDCCH) (configured scheduling or configured grant). The PUSCH transmission may be performed in a codebook-based or non-codebook-based manner.

On DL, the BS may dynamically allocate resources for DL transmission to the UE by PDCCH(s) (including DCI format 1_0 or DCI format 1_1). Further, the BS may indicate to a specific UE that some of resources pre-scheduled for the UE have been pre-empted for signal transmission to another UE, by PDCCH(s) (including DCI format 2_1). Further, the BS may configure a DL assignment periodicity by higher-layer signaling and signal activation/deactivation of a configured DL assignment by a PDCCH in a semi-persistent scheduling (SPS) scheme, to provide a DL assignment for an initial HARQ transmission to the UE. When a retransmission for the initial HARQ transmission is required, the BS explicitly schedules retransmission resources through a PDCCH. When a DCI-based DL assignment collides with an SPS-based DL assignment, the UE may give priority to the DCI-based DL assignment.

Similarly to DL, for UL, the BS may dynamically allocate resources for UL transmission to the UE by PDCCH(s) (including DCI format 0_0 or DCI format 0_1). Further, the BS may allocate UL resources for initial HARQ transmission to the UE based on a configured grant (CG) method (similarly to SPS). Although dynamic scheduling involves a PDCCH for a PUSCH transmission, a configured grant does not involve a PDCCH for a PUSCH transmission. However, UL resources for retransmission are explicitly allocated by PDCCH(s). As such, an operation of preconfiguring UL resources without a dynamic grant (DG) (e.g., a UL grant through scheduling DCI) by the BS is referred to as a "CG". Two types are defined for the CG.

Type 1: a UL grant with a predetermined periodicity is provided by higher-layer signaling (without L1 signaling).

Type 2: the periodicity of a UL grant is configured by higher-layer signaling, and activation/deactivation of the CG is signaled by a PDCCH, to provide the UL grant.

Figure 5:
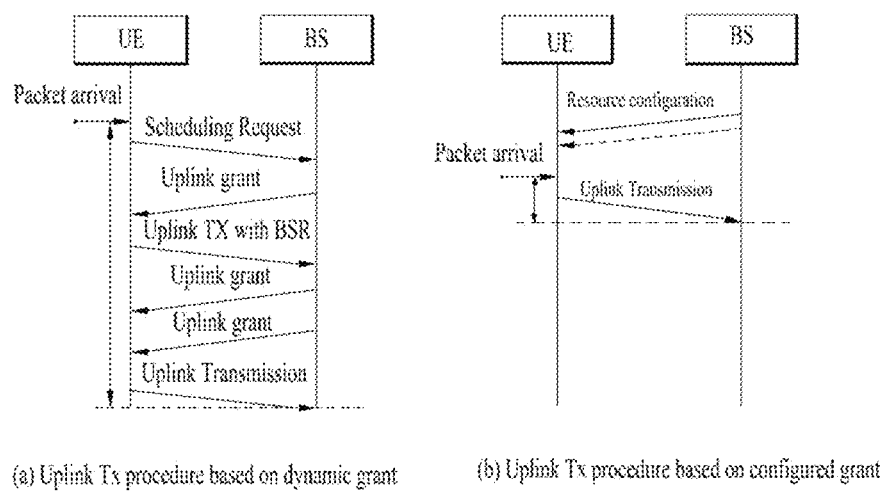
FIG. 5 illustrates exemplary uplink (UL) transmission operations of a user equipment (UE)

FIG. 5 illustrates exemplary UL transmission operations of a UE. The UE may transmit an intended packet based on a DG (FIG. 5(a)) or based on a CG (FIG. 5(b)).

Resources for CGs may be shared between a plurality of UEs. A UL signal transmission based on a CG from each UE may be identified by time/frequency resources and an RS parameter (e.g., a different cyclic shift or the like). Therefore, when a UE fails in transmitting a UL signal due to signal collision, the BS may identify the UE and explicitly transmit a retransmission grant for a corresponding TB to the UE.

K repeated transmissions including an initial transmission are supported for the same TB by a CG. The same HARQ process ID is determined for K times repeated UL signals based on resources for the initial transmission. The redundancy versions (RVs) of a K times repeated TB have one of the patterns {0, 2, 3, 1}, {0, 3, 0, 3}, and {0, 0, 0, 0}.

Figure 6:
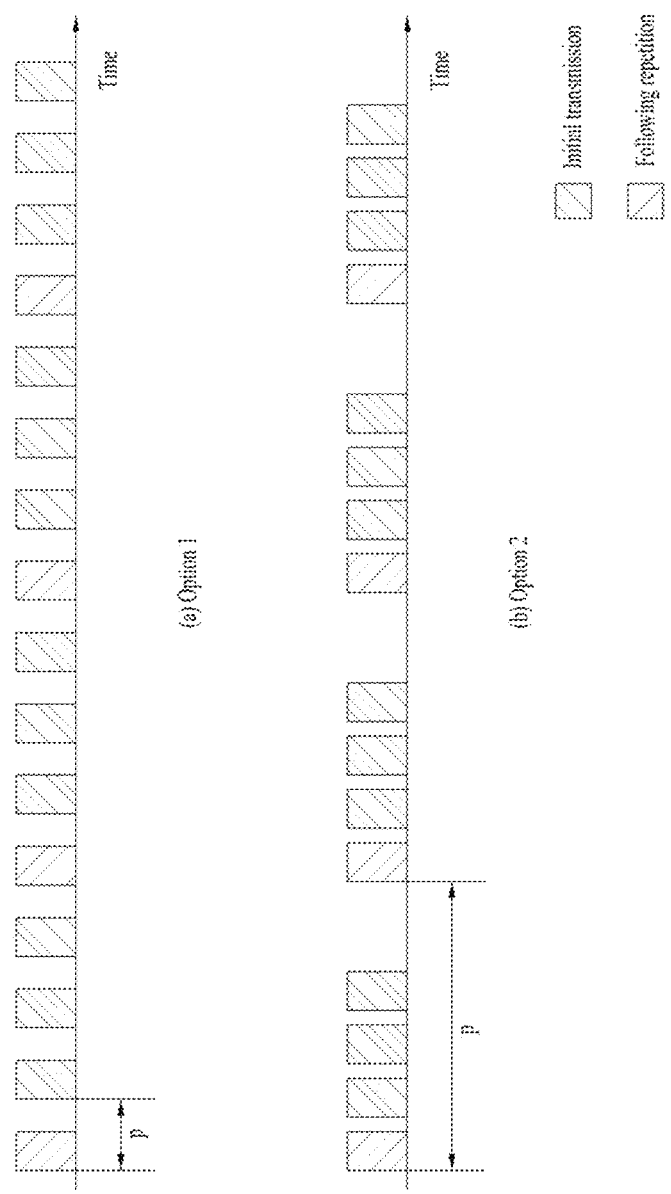
FIG. 6 illustrates exemplary repeated transmissions based on a configured grant.

FIG. 6 illustrates exemplary repeated transmissions based on a CG.

The UE performs repeated transmissions until one of the following conditions is satisfied:
  A UL grant for the same TB is successfully received;
  The repetition number of the TB reaches K; and
  (In Option 2) the ending time of a period P is reached.

Similarly to licensed-assisted access (LAA) in the legacy 3GPP LTE system, use of an unlicensed band for cellular communication is also under consideration in a 3GPP NR system. Unlike LAA, a stand-along (SA) operation is aimed in an NR cell of an unlicensed band (hereinafter, referred to as NR unlicensed cell (UCell)). For example, PUCCH, PUSCH, and PRACH transmissions may be supported in the NR UCell.

In an NR system to which various embodiments of the present disclosure are applicable, up to 400 MHz per component carrier (CC) may be allocated/supported. When a UE operating in such a wideband CC always operates with a radio frequency (RF) module turned on for the entire CC, battery consumption of the UE may increase.

Alternatively, considering various use cases (e.g., eMBB, URLLC, mMTC, and so on) operating within a single wideband CC, a different numerology (e.g., SCS) may be supported for each frequency band within the CC.

Alternatively, each UE may have a different maximum bandwidth capability.

In this regard, the BS may indicate to the UE to operate only in a partial bandwidth instead of the total bandwidth of the wideband CC. The partial bandwidth may be defined as a bandwidth part (BWP).

A BWP may be a subset of contiguous RBs on the frequency axis. One BWP may correspond to one numerology (e.g., SCS, CP length, slot/mini-slot duration, and so on).

The BS may configure multiple BWPs in one CC configured for the UE. For example, the BS may configure a BWP occupying a relatively small frequency area in a PDCCH monitoring slot, and schedule a PDSCH indicated (or scheduled) by a PDCCH in a larger BWP. Alternatively, when UEs are concentrated on a specific BWP, the BS may configure another BWP for some of the UEs, for load balancing. Alternatively, the BS may exclude some spectrum of the total bandwidth and configure both-side BWPs of the cell in the same slot in consideration of frequency-domain inter-cell interference cancellation between neighboring cells.

The BS may configure at least one DL/UL BWP for a UE associated with the wideband CC, activate at least one of DL/UL BWP(s) configured at a specific time point (by L1 signaling (e.g., DCI), MAC signaling, or RRC signaling), and indicate switching to another configured DL/UL BWP (by L1 signaling, MAC signaling, or RRC signaling). Further, upon expiration of a timer value (e.g., a BWP inactivity timer value), the UE may switch to a predetermined DL/UL BWP. The activated DL/UL BWP may be referred to as an active DL/UL BWP. During initial access or before an RRC connection setup, the UE may not receive a configuration for a DL/UL BWP from the BS. A DL/UL BWP that the UE assumes in this situation is defined as an initial active DL/UL BWP.

Embodiments of the Present Disclosure

FIG. 7 illustrates an exemplary wireless communication system supporting an unlicensed band applicable to the present disclosure.

In the following description, a cell operating in a licensed band (L-band) is defined as an L-cell, and a carrier of the L-cell is defined as a (DL/UL) LCC. A cell operating in an unlicensed band (U-band) is defined as a U-cell, and a carrier of the U-cell is defined as a (DL/UL) UCC. The carrier/carrier-frequency of a cell may refer to the operating frequency (e.g., center frequency) of the cell. A cell/carrier (e.g., CC) is commonly called a cell.

When a BS and a UE transmit and receive signals on carrier-aggregated LCC and UCC as illustrated in FIG. 7(a), the LCC and the UCC may be configured as a primary CC (PCC) and a secondary CC (SCC), respectively. The BS and the UE may transmit and receive signals on one UCC or on a plurality of carrier-aggregated UCCs as illustrated in FIG. 7(b). In other words, the BS and UE may transmit and receive signals only on UCC(s) without using any LCC. For an SA operation, PRACH, PUCCH, PUSCH, and SRS transmissions may be supported on a UCell.

Signal transmission and reception operations in an unlicensed band as described in the present disclosure may be applied to the afore-mentioned deployment scenarios (unless specified otherwise).

Unless otherwise noted, the definitions below are applicable to the following terminologies used in the present disclosure.

Channel: a carrier or a part of a carrier composed of a contiguous set of RBs in which a channel access procedure (CAP) is performed in a shared spectrum.

Channel access procedure (CAP): a procedure of assessing channel availability based on sensing before signal transmission in order to determine whether other communication node(s) are using a channel. A basic sensing unit is a sensing slot with a duration of $T_{sl}$=9 us. The BS or the UE senses the slot during a sensing slot duration. When power detected for at least 4 us within the sensing slot duration is less than an energy detection threshold $X_{thresh}$, the sensing slot duration $T_{sl}$ is be considered to be idle. Otherwise, the sensing slot duration $T_{sl}$ is considered to be busy. CAP may also be called listen before talk (LBT), Channel occupancy: transmission(s) on channel(s) from the BS/UE after a CAP.

Channel occupancy time (COT): a total time during which the BS/UE and any BS/UE(s) sharing channel occupancy performs transmission(s) on a channel after a CAP. Regarding COT determination, if a transmission gap is less than or equal to 25 us, the gap duration may be counted in a COT. The COT may be shared for transmission between the BS and corresponding UE(s).

DL transmission burst: a set of transmissions without any gap greater than 16 us from the BS. Transmissions from the BS, which are separated by a gap exceeding 16 us are considered as separate DL transmission bursts. The BS may perform transmission(s) after a gap without sensing channel availability within a DL transmission burst.

UL transmission burst: a set of transmissions without any gap greater than 16 us from the UE. Transmissions from the UE, which are separated by a gap exceeding 16 us are considered as separate UL transmission bursts. The UE may perform transmission(s) after a gap without sensing channel availability within a DL transmission burst.

Discovery burst: a DL transmission burst including a set of signal(s) and/or channel(s) confined within a window and associated with a duty cycle. The discovery burst may include transmission(s) initiated by the BS, which includes a PSS, an SSS, and a cell-specific RS (CRS) and further includes a non-zero power CSI-RS.

In the NR system, the discover burst includes may include transmission(s) initiated by the BS, which includes at least an SS/PBCH block and further includes a CORESET for a PDCCH scheduling a PDSCH carrying SIB 1 the PDSCH carrying SIB 1, and/or a non-zero power CSI-RS.

Figure 8:
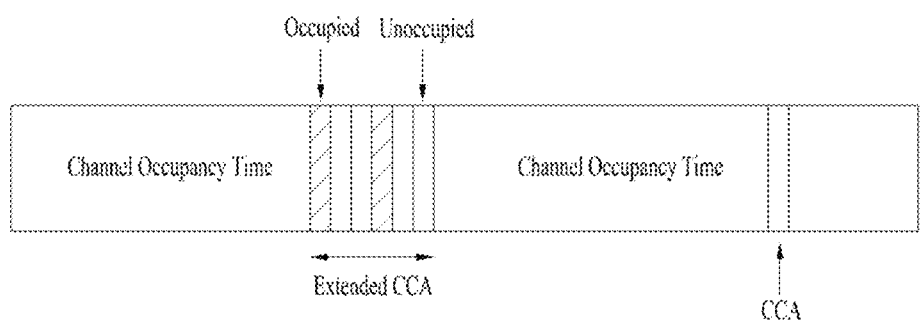
FIG. 8 illustrates an exemplary method of occupying resources in an unlicensed band.

FIG. 8 illustrates an exemplary method of occupying resources in an unlicensed band.

Referring to FIG. 8, a communication node (e.g., a BS or a UE) operating in an unlicensed band should determine whether other communication node(s) is using a channel, before signal transmission. For this purpose, the communication node may perform a CAP to access channel(s) on which transmission(s) is to be performed in the unlicensed band. The CAP may be performed based on sensing. For example, the communication node may determine whether other communication node(s) is transmitting a signal on the channel(s) by carrier sensing (CS) before signal transmission. Determining that other communication node(s) is not transmitting a signal is defined as confirmation of clear channel assessment (CCA). In the presence of a CCA threshold (e.g., $X_{thresh}$) which has been predefined or configured by higher-layer (e.g., RRC) signaling, the communication node may determine that the channel is busy, when detecting energy higher than the CCA threshold in the channel. Otherwise, the communication node may determine that the channel is idle. When determining that the channel is idle, the communication node may start to transmit a signal in the unlicensed band. CAP may be replaced with LBT.

Table 7 describes an exemplary CAP supported in NR-U.

TABLE 7

| | Type | Explanation |
|---|---|---|
| DL | Type 1 CAP | CAP with random backoff time duration spanned by the sensing slots that are sensed to be idle before a downlink transmission(s) is random |
| | Type 2 CAP Type 2A, 2B, 2C | CAP without random backoff time duration spanned by sensing slots that are sensed to be idle before a downlink transmission(s) is deterministic |
| UL | Type 1 CAP | CAP with random backoff time duration spanned by the sensing slots that are sensed to be idle before a downlink transmission(s) is random |
| | Type 2 CAP Type 2A, 2B, 2C | CAP without random backoff time duration spanned by sensing slots that are sensed to be idle before a downlink transmission(s) is deterministic |

In a wireless communication system supporting an unlicensed band, one cell (or carrier (e.g., CC)) or BWP configured for a UE may be a wideband having a larger bandwidth (BW) than in legacy LTE. However, a BW requiring CCA based on an independent LBT operation may be limited according to regulations. Let a subband (SB) in which LBT is individually performed be defined as an LBT-SB. Then, a plurality of LBT-SBs may be included in one wideband cell/BWP. A set of RBs included in an LBT-SB may be configured by higher-layer (e.g., RRC) signaling. Accordingly, one or more LBT-SBs may be included in one cell/BWP based on (i) the BW of the cell/BWP and (ii) RB set allocation information.

A plurality of LBT-SBs may be included in the BWP of a cell (or carrier). An LBT-SB may be, for example, a 20-MHz band. The LBT-SB may include a plurality of contiguous (P)RBs in the frequency domain, and thus may be referred to as a (P)RB set.

A UE performs a Type 1 or Type 2 CAP for a UL signal transmission in an unlicensed band. In general, the UE may perform a CAP (e.g., Type 1 or Type 2) configured by a BS, for a UL signal transmission. For example, CAP type indication information may be included in a UL grant (e.g., DCI format 0_0 or DCI format 0_1) that schedules a PUSCH transmission.

In the Type 1 UL CAP, the length of a time period spanned by sensing slots sensed as idle before transmission(s) is random. The Type 1 UL CAP may be applied to the following transmissions.

PUSCH/SRS transmission(s) scheduled and/or configured by BS

PUCCH transmission(s) scheduled and/or configured by BS

Transmission(s) related to random access procedure (RAP)

Figure 9:
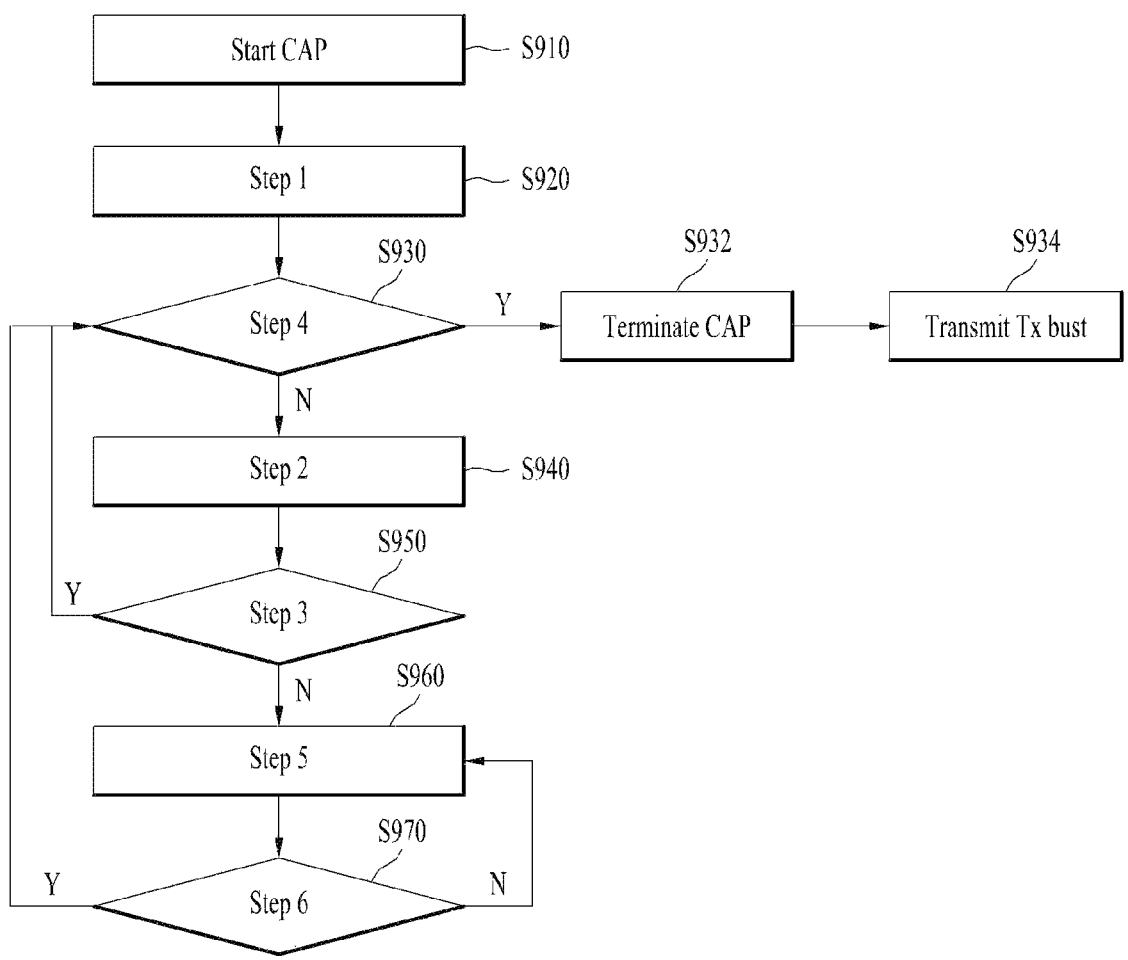
FIG. 9 illustrates an exemplary channel access procedure of a UE for UL signal transmission in an unlicensed band applicable to the present disclosure.

FIG. 9 illustrates a Type 1 CAP among CAPs of a UE for a UL signal transmission in an unlicensed band applicable to the present disclosure.

Referring to FIG. 9, the UE may sense whether a channel is idle for a sensing slot duration in a defer duration $T_d$. After a counter N is decremented to 0, the UE may perform a transmission (S934). The counter N is adjusted by sensing the channel for additional slot duration(s) according to the following procedure.

Step 1) Set N=$N_{init}$ where $N_{init}$ is a random number uniformly distributed between 0 and $CW_p$, and go to step 4 (S920).

Step 2) If N>0 and the UE chooses to decrement the counter, set N=N−1 (S940).

Step 3) Sense the channel for an additional slot duration, and if the additional slot duration is idle (Y), go to step 4. Else (N), go to step 5 (S950).

Step 4) If N=0 (Y) (S930), stop CAP (S932). Else (N), go to step 2.

Step 5) Sense the channel until a busy sensing slot is detected within the additional defer duration $T_d$ or all slots of the additional defer duration $T_d$ are sensed as idle (S960).

Step 6) If the channel is sensed as idle for all slot durations of the additional defer duration $T_d$ (Y), go to step 4. Else (N), go to step 5 (S970).

Table 8 illustrates that $m_p$, a minimum CW, a maximum CW, a maximum channel occupancy time (MCOT), and an allowed CW size applied to a CAP vary according to channel access priority classes.

TABLE 8

| Channel Access Priority Class (p) | $m_p$ | $CW_{min,p}$ | $CW_{max,p}$ | $T_{ulmcot,p}$ | allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 or 10 ms | {15, 31, 63, 127, 255, 511, 1023} |
| 4 | 7 | 15 | 1023 | 6 or 10 ms | {15, 31, 63, 127, 255, 511, 1023} |

The defer duration $T_d$ includes a duration $T_f$ (16 us) immediately followed by $m_p$ consecutive slot durations where each slot duration $T_{sl}$ is 9 us, and $T_f$ includes a sensing slot duration $T_{sl}$ at the start of the 16-us duration.

$CW_{Wmin,p}$<=$CW_p$<=$CW_{max,p}$. $CW_p$ is set to $CW_{min,p}$, and may be updated before Step 1 based on an explicit/implicit reception response to a previous UL burst (e.g., PUSCH) (CW size update). For example, $CW_p$ may be initialized to $CW_{min,p}$ based on an explicit/implicit reception response to the previous UL burst, may be increased to the next higher allowed value, or may be maintained to be an existing value.

In the Type 2 UL CAP, the length of a time period spanned by sensing slots sensed as idle before transmission(s) is deterministic. Type 2 UL CAPs are classified into Type 2A UL CAP, Type 2B UL CAP, and Type 2C UL CAP. In the Type 2A UL CAP, the UE may transmit a signal immediately after the channel is sensed as idle during at least a sensing duration $T_{short\_dl}$ (=25 us). $T_{short\_dl}$ includes a duration Tf (=16 us) and one immediately following sensing slot duration. In the Type 2A UL CAP, $T_f$ includes a sensing slot at the start of the duration. In the Type 2B UL CAP, the UE may transmit a signal immediately after the channel is sensed as idle during a sensing slot duration $T_f$(=16 us). In the Type 2B UL CAP, $T_f$ includes a sensing slot within the last 9 us of the duration. In the Type 2C UL CAP, the UE does not sense a channel before a transmission.

To allow the UE to transmit UL data in the unlicensed band, the BS should succeed in an LBT operation to transmit a UL grant in the unlicensed band, and the UE should also succeed in an LBT operation to transmit the UL data. That is, only when both of the BS and the UE succeed in their LBT operations, the UE may attempt the UL data transmission. Further, because a delay of at least 4 msec is involved between a UL grant and scheduled UL data in the LTE system, earlier access from another transmission node coexisting in the unlicensed band during the time period may defer the scheduled UL data transmission of the UE. In this context, a method of increasing the efficiency of UL data transmission in an unlicensed band is under discussion.

To support a UL transmission having a relatively high reliability and a relatively low time delay, NR also supports CG type 1 and CG type 2 in which the BS preconfigures time, frequency, and code resources for the UE by higher-layer signaling (e.g., RRC signaling) or both of higher-layer signaling and L1 signaling (e.g., DCI). Without receiving a UL grant from the BS, the UE may perform a UL transmission in resources configured with type 1 or type 2. In type 1, the periodicity of a CG, an offset from SFN=0, time/frequency resource allocation, a repetition number, a DMRS parameter, an MCS/TB size (TBS), a power control parameter, and so on are all configured only by higher-layer signaling such as RRC signaling, without L1 signaling. Type 2 is a scheme of configuring the periodicity of a CG and a power control parameter by higher-layer signaling such as RRC signaling and indicating information about the remaining resources (e.g., the offset of an initial transmission timing, time/frequency resource allocation, a DMRS parameter, and an MCS/TBS) by activation DCI as L1 signaling.

Before a description of proposed methods, NR-based channel access schemes for an unlicensed band used in the present disclosure are classified as follows.

Category 1 (Cat-1): the next transmission immediately follows the previous transmission after a switching gap within a COT, and the switching gap is shorter than 16 us, including even a transceiver turn-around time. Cat-1 LBT may correspond to the above-described Type 2C CAP.

Category 2 (Cat-2): an LBT method without backoff. Once a channel is confirmed to be idle during a specific time period shortly before transmission, the transmission may be performed immediately. Cat-2 LBT may be subdivided according to the length of a minimum sensing duration required for channel sensing immediately before a transmission. For example, Cat-2 LBT with a minimum sensing duration of 25 us may correspond to the above-described Type 2A CAP, and Cat-2 LBT with a minimum sensing duration of 16 us may correspond to the above-described Type 2B CAP. The minimum sensing durations are merely exemplary, and a minimum sensing duration less than 25 us or 16 us (e.g., a minimum sensing duration of 9 us) may also be available.

Category 3 (Cat-3): an LBT method with fixed contention window size (CWS)i-based backoff. A transmitting entity selects a random number N in a range of 0 to a (fixed) maximum CWS value and decrements a counter value each time it determines that a channel is idle. When the counter value reaches 0, the transmitting entity is allowed to perform a transmission.

Category 4 (Cat-4): an LBT method with variable CWS-based backoff. A transmitting entity selects a random number N in a range of 0 to a (variable) maximum CWS value and decrements a counter value, each time it determines that a channel is idle. When the counter value reaches 0, the transmitting entity is allowed to perform a transmission. If the transmitting entity receives a feedback indicating reception failure of the transmission, the transmitting entity increases the maximum CWS value by one level, selects a random number again within the increased CWS value, and performs an LBT procedure. Cat-4 LBT may correspond to the above-described Type 1 CAP.

The following description is given with the appreciation that the term band may be interchangeably used with CC/cell, and a CC/cell (index) may be replaced with a BWP (index) configured within the CC/cell, or a combination of the CC/cell (index) and the BWP (index).

Terms are defined as follows.

UCI: control information transmitted on UL by the UE. UCI includes various types of control information (i.e., UCI types). For example, the UCI may include an HARQ-ACK (simply, A/N or AN), an SR, and CSI.

PUCCH: a physical layer UL channel for UCI transmission. For convenience, PUCCH resources configured and/or indicated for A/N, SR, and CSI transmission are referred to as A/N PUCCH resources, SR PUCCH resources, and CSI PUCCH resources, respectively.

UL grant DCI: DCI for a UL grant. For example, UL grant DCI means DCI formats 0_0 and 0_1, and is transmitted on a PDCCH.

DL assignment/grant DCI: DCI for a DL grant. For example, DL assignment/grant DCI means DCI formats 1_0 and 1_1, and is transmitted on a PDCCH.

PUSCH: a physical layer UL channel for UL data transmission.

Slot: a basic time unit (TU) (or time interval) for data scheduling. A slot includes a plurality of symbols. Herein, a symbol includes an OFDM symbol (e.g., CP-OFDM symbol or DFT-s-OFDM symbol). In this specification, the terms symbol, OFDM-based symbol, OFDM symbol, CP-OFDM symbol, and DFT-s-OFDM symbol may be replaced with each other.

Channel: a carrier or a part of a carrier composed of a set of contiguous RBs in which a CAP is performed in a shared spectrum. For example, a channel may mean a frequency unit in which LBT is performed, and may be interchangeably used with an LBT-SB in the following description.

LBT for channel X: this means that LBT is performed to check whether channel X is available. For example, before a transmission starts on channel X, a CAP may be performed.

Frame based equipment (FBE) is equipment that transmits and receives signals at a periodic timing with a periodicity equal to a fixed frame period (FFP). To allow the FBE to perform channel access on an operating channel in an unlicensed band, an LBT-based channel access mechanism should be implemented. LBT refers to a CCA mechanism performed before channel access and is performed in a single observation slot. An observation slot is a time period during which it is determined whether there is any transmission from another radio local area network (RLAN) on an operating channel, which is at least 9 us. A device that initiates one or more transmissions is referred to as an initiating device. Otherwise, the device is referred to as a responding device. The FBE may be an initiating device, a responding device, or both.

FIG. 9 illustrates an exemplary timing structure for the FBE, in which an FFP including a COT of a predetermined duration and an idle period is periodically repeated. CCA is performed in an observation slot within the idle period. When there is no other RLAN transmission on an operating channel as a result of CCA in the observation slot within the idle period of FFP #N, that is, the energy measurement of the observation slot is less than a CCA threshold, the UE may start a transmission in the COT of FFP #N+1. Supported FFP values are announced by a device manufacturer and range from 1ms to 10 ms. A device may change an FFP only once per 200 ms. The length of the COT in the FFP may not exceed 95% of the length of the FFP, and the idle period should be set to at least 5% of the COT length, at least 100 us.

In FBE mode, Cat-1 LBT and Cat-2 LBT may be used the BS and the UE. That is, the BS or the UE operating in the FBE mode may use a CAP that is not based on random backoff. Cat-2 LBT may be performed 25 us just before the start of the next FFP in the idle period within the previous 1-1-P, or may be applied when the gap between transmissions such as a DL-to-DL, UL-to-DL, DL-to-UL, or UL-to-DL gap, is 25 us or 16 us. Alternatively, when the gap between transmissions exceeds 16 us, Cat-2 LBT may be applied. Cat-1 LBT may be applied when the gap between transmissions is 16 us or when the gap between transmissions is up to 16 us. The transmission duration of a signal/channel transmitted after Cat-1 LBT may be limited.

The present disclosure proposes a method of transmitting and configuring/indicating a signal/channel such as a PRACH, a configured grant (CG) PUSCH, a periodic/semi-persistent PUCCH, and a periodic/semi-persistent SRS, when a BS and a UE operate in the FBE mode (when a BS and a UE operate in a transmission/reception structure having a periodic timing with a periodicity equal to an FFP).

To initially access the BS, the UE receives cell-related information and RACH configuration information in a PBCH and remaining minimum system information (RMSI) broadcast by the BS. RMSI is system information acquired based on a master information block (MIB) acquired from the PBCH, and may be referred to as system information block 1 (SIB1). The BS broadcasts the PBCH and RMSI including the cell-related information and the RACH configuration information, for UEs initially accessing the BS. The UE transmits an RACH preamble (PRACH) at a time/frequency configured by the RACH configuration information in the RMSI. The RMSI received from the BS may explicitly indicate/configure the FBE mode to/for the UE, along with information such as an FFP and an idle period, or the RACH configuration may indicate/configure Cat-2 (or Cat-1) as the LBT type to/for the UE so that the UE may implicitly determine the FBE mode. Alternatively, the RACH configuration may indicate/configure Cat-4 as the LBT type to/for the UE so that the UE may implicitly determine the operation mode to be load based equipment (LBE) mode. According to the indicated/configured LBT type, the UE may identify the operation mode as the LBE mode or the FBE mode.

However, the LBT types are exemplary. The UE may determine whether the operation mode is the LBE mode or the FBE mode according to whether the indicated LBT type is or is not based on random backoff.

The FBE mode and the LBE mode may be types of channel access mode.

That is, both the FBE mode and the LBE mode may be supported as channel access modes in a wireless communication system supporting an unlicensed band to which the present disclosure is applied.

The LBE mode may refer to a mode in which when a UE or a BS is to transmit a signal, the UE or the BS transmits the signal based on the result of a CAP. Compared to the FBE mode in which a signal may be transmitted by performing a CAP only in an FFP, the UE or the BS may transmit a signal by performing a CAP irrespective of a specific periodicity such as the FFP in the LBE mode. In the above description, Cat-4 is exemplary, and the UE or the BS may perform both a random backoff-based CAP and a non-random backoff-based CAP in the LBE mode. For example, when the UE operates in the LBE mode, the UE may perform any of a Type 1 CAP, a Type 2A CAP, a Type 2B CAP, and a Type 2C CAP.

Figure 10:
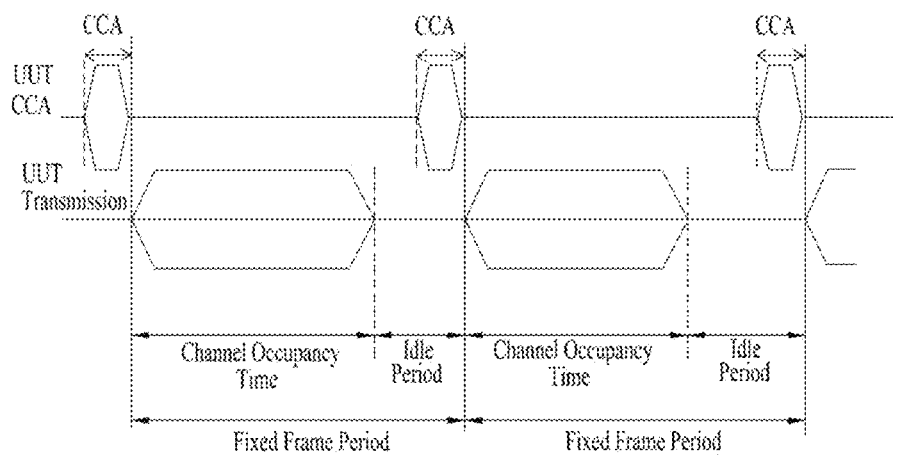
FIGS. 10 and 11 illustrate exemplary time resources for channel access modes according to an embodiment of the present disclosure.

In contrast, the UE or the BS may perform only a non-random backoff-based CAP, that is, a CAP corresponding to Cat-1 or Cat-2 in the FBE mode. In the FBE mode, once a channel is confirmed as idle, for example, for 9 us, a signal transmission may be allowed. Referring to FIG. 10, the UE or the BS may perform a CAP only in the idle period of an FFP, and the CAP may not be based on random backoff.

As the wireless communication system supporting an unlicensed band to which the present disclosure is applied supports two types of channel access modes, the UE needs to know the channel access mode of a serving cell or a cell to be accessed.

As described above, the UE may acquire a channel access mode through a higher-layer signal (e.g., SIB). In the case of the FBE mode, the UE may also acquire FFP-related information from the higher-layer signal.

Before a description of proposed method #1, an overall PRACH transmission operation of a UE will be described. The UE receives information about an RACH configuration, and acquires information about the starting OFDM symbol of a PRACH transmission, an RACH slot, and the number of a plurality of RACH occasions (ROs) included in the RACH slot based on the RACH configuration. The UE may transmit a PRACH in a specific RO among the plurality of ROs based on the acquired information. An RO in which a PRACH is transmitted is referred to as a "valid RO".

Each of the proposed methods described below may be applied in combination with other proposed methods, unless they contradict with each other.

[Proposed method #1] When the FBE mode is indicated/configured to/for the UE or the LBT type of a PRACH is indicated/configured as Cat-2 (or Cat-1), by RMSI and/or another SIB and/or a UE-dedicated RRC signal received from the BS, the UE may transmit the PRACH in a "valid RO" within x ms (or x slots) upon receipt/detection of a specific signal/channel. For example, the UE may transmit the PRACH in a valid RO, considering an RO within a predetermined time after receiving the specific signal to be valid. The starting time of x may be defined (relatively) from the start or end of the specific signal/channel (or CORESET) or as an absolute time (e.g., every frame boundary or the starting time of every DRS transmission window). The specific signal/channel of which the reception/detection triggers transmission of the PRACH may be configured by RMSI or determined according to a definition in the standards. The signal/channel based on which whether the UE is to transmit the PRACH is determined may be configured on an RO basis or for an RO group (or for all ROs). Further, the value of x may be predefined or signaled by RMSI and/or another SIB and/or a UE-dedicated RRC signal.

When the UE fails in receiving/detecting the specific signal/channel, the UE may not attempt to transmit the PRACH (or perform LBT for the PRACH) in an RO associated with the specific signal/channel, considering that the BS has failed in LBT. In the case where an FFP is configured, when the UE succeeds in LBT, the UE may attempt to transmit the PRACH in an RO configured at an FFP boundary among ROs configured in an RACH slot, irrespective of reception/detection of the specific signal/channel.

The BS may define two Cat-2 LBT types that the UE is supposed to perform before the PRACH transmission and signal one of the two Cat-2 BLT types to the UE. For example, for Cat-2 LBT Type 1, the UE may consider that a configured specific RO is always valid under any condition, and transmit the PRACH, upon acquisition of a UE-initiated COT by Cat-2 LBT in the specific RO. That is, the UE may perform a CAP and transmit the PRACH in the specific RO, serving as an initiating device, irrespective of whether the UE has detected the specific signal. In another example, for Cat-2 LBT Type 2, the UE may determine the validity of an RO according to whether the specific signal/channel has been received/detected and transmit the PRACH by sharing a COT of the BS, when succeeding in Cat-2 LBT. That is, after determining whether an RO is valid depending on whether a gNB-initiated COT has been detected, the UE may transmit the PRACH by sharing the COT of the BS, when succeeding in Cat-2 LBT in a valid RO. Alternatively, with a plurality of ROs configured, a Cat-2 LBT type to be used may be configured/indicated on a configured RO basis by an RRC signal or RMSI, or whether an RO is configured in the middle of an FFP or in alignment with the starting time of the FFP may be configured/indicated on an RO basis.

Before transmitting the PRACH, the UE should attempt to receive/detect all or some of the following signals/channels.
(1) PSS and/or SSS (of serving cell)
(2) PBCH DMRS and/or PBCH payload (of serving cell)
(3) RMSI PDCCH and/or PDSCH (of serving cell)
(4) PDCCH scrambled with specific RNTI (e.g., P-RNTI, SI-RNTI, or the like) (of serving cell)

PDCCH and/or PDSCH reception may include DMRS detection. Further, every channel/signal may be linked to an RO selected by the UE. For example, in the case where the UE intends to select an RO linked to a specific SSB index (or SSB beam index) and transmit a specific PRACH preamble in the RO resources, when the UE succeeds in detecting/decoding a PSS and/or an SSS and/or a PBCH DMRS and/or PBCH payload and/or an RMSI PDCCH and/or an RMSI PDSCH and/or paging DCI and/or a paging message, which is placed in a quasi co-location (QCL) relationship with the SSB index (or SSB beam index), the UE may transmit the PRACH in a "valid RO" within x ms (or x slots). When a signal/channel of which the detection/reception triggers a PRACH transmission has not been defined, the UE may attempt to transmit the PRACH in a corresponding RO (in the same manner as in the operation in an RO aligned with an FFP boundary), when succeeding in LBT. Further, when an LBT type is indicated as Cat-2 or Cat-1 by RMSI or a PDCCH or when it is predefined that Cat-1 is used for a specific signal/channel, an RO with a limited time length may be configured or defined.

This proposed method is also applicable for msgA PUSCH transmission in a 2-step RACH procedure. Specifically, the 2-step RACH procedure may be a procedure in which after transmitting an msgA PRACH preamble in an RO, a UE transmits an msgA PUSCH without a feedback (e.g., msg2 such as a random access response (RAR) in a 4-step RACH procedure) from a corresponding BS, and the BS receiving the msgA PUSCH transmits msgB corresponding to msgA, thereby achieving contention resolution only in two steps. msgA PUSCH transmission resources may be defined as a PUSCH occasion (PO). When a gap is configured between an RO and a PO, LBT may be supposed to be performed immediately before the PO and the proposed method may be applied in relation to an LBT method.

For an msgA PRACH preamble configured with the FBE mode, for example, when the UE attempts to transmit the msgA PRACH preamble after succeeding in Cat-2 (or Cat-1) LBT in a specific RO, the UE may be allowed to transmit an msgA PUSCH in a PO associated with the RO irrespective of reception/detection of a DL signal/channel, upon success of Cat-2 (or Cat-1) LBT. Alternatively, a different rule may be defined according to a timing gap (predefined or configured) between an RO and a PO. For example, when the timing gap spans Y or fewer slots (or milliseconds), the UE may be allowed to transmit the msgA PUSCH in the PO associated with the transmission RO irrespective of reception/detection of the DL signal/channel, upon success of Cat-2 (or Cat-1) LBT. When the timing gap spans more slots (or milliseconds) than Y, the UE may be allowed to transmit the msgA PUSCH in the PO associated with the transmission RO according to reception/detection of the DL signal/channel, upon success of Cat-2 (or Cat-1) LBT.

The BS may transmit information required for initial access to a cell to the UE by a PBCH and RMSI which are broadcast. The BS may explicitly transmit information about an FFP and an idle period for the FBE mode or implicitly indicate the FBE mode by configuring/indicating an LBT type for PRACH transmission as Cat-2 for/to the UE. The UE may receive information required for RACH transmission by receiving an RACH configuration in the RMSI. The RACH configuration may include information about time/frequency resources and an LBT type, for an RACH procedure.

The UE may transmit the PRACH (in FFP #N+1) after succeeding in Cat-2 LBT in the idle period of the previous FFP (FFP #N) or after performing Cat-2 (or Cat-1) LBT by sharing a COT which the BS has obtained by LBT success. An RO configuration in an RACH slot and a signal/channel of which the reception/detection triggers PRACH transmission may be defined in RMSI or standards. When the UE fails in detecting the specific signal/channel (in FFP #N), the UE may not transmit the PRACH in ROs of a corresponding FFP (FFP #N), considering that the BS has failed in the LBT and thus has not acquired the COT (of FFP #N). Alternatively, when the UE acquires a COT by Cat-2 LBT in a specific RO configured in alignment with an FFP boundary among ROs configured in the RACH slot, the UE may transmit the RACH according to a configuration. Further, when Cat-1 LBT is indicated/configured to/for the UE, the UE may be allowed to transmit the RACH only in a specific RO configured to have a limited time length.

When the UE detects the specific signal/channel, the UE may transmit the PRACH in a valid RO within x ms (or x slots), and the starting time of x may be defined as the start or end of the following signal/channel (or CORESET) or as an absolute time. PDCCH reception may include DMRS detection and the specific channel/signal may be linked to an RO selected by the UE. For example, when the UE succeeds in receiving an RMSI PDCCH, the UE may perform Cat-2 LBT in one of valid ROs within the preconfigured x ms. When a measured energy is lower than a threshold, the UE may determine the channel to be idle and transmit the PRACH using frequency resources and a sequence based on the RACH configuration.

[Proposed method #2] The FBE mode may be indicated/configured to/for the UE or the LBT type of a configured grant (CG)-PUSCH (or a periodic/semi-persistent SRS or a periodic/semi-persistent PUCCH) may be indicated/configured as Cat-2 (or Cat-1) LBT to/for the UE, by RMSI and/or another SIB and/or a UE-dedicated RRC signal received from the BS. When the UE succeeds in receiving/detecting a specific PDCCH, the UE is allowed to transmit a CG-PUSCH within x ms (or x slots). In other words, when the UE succeeds in the LBT of the configured/indicated LBT type before transmitting the CG-PUSCH, the UE may transmit the CG-PUSCH. The specific PDCCH may be a group common (GC)-PDCCH including time/frequency channel occupancy information about the BS. When the UE succeeds in detecting the PDCCH or a PDCH DRMS, this proposed method may be applied, or whether a corresponding CG-PUSCH is transmitted may be signaled by a specific field of the GC-PDCCH. While the proposed method is described in the context of the CG-PUSCH for the convenience of description, the same method is applicable to a UL signal/channel which may start to be transmitted without a UL grant, such as a periodic/semi-persistent SRS and/or a periodic/semi-persistent PUCCH.

The starting time of x may be defined (relatively) from the start or end of a specific PDCCH (or CORESET in which the PDCCH may be transmitted) or as an absolute time (e.g., a frame boundary). The value of x may be predefined or configured by RMSI and/or another SIB and/or a UE-dedicated RRC signal. Further, a signal/channel of which the detection/reception triggers a UL channel/signal transmission may be configured by a higher-layer signal such as an RRC signal, activation DCI (particularly in the case of CG Type 2 or a semi-persistent SRS/PUCCH), or both, or may be predefined/preagreed in the standards. When the UE fails in receiving/detecting the specific PDCCH in a specific FFP, the UE may not transmit a UL channel/signal, considering that the BS has failed in LBT in the specific FFP. Alternatively, in the case where an FFP is configured and time resources are configured at an FFP boundary, when the UE succeeds in Cat-2 LBT, the UE may transmit a UL channel/signal in the FFP irrespective of reception/detection of the specific PDCCH.

Two Cat-2 LBT types may be defined, which should be performed by the UE before a UL transmission. In Cat-2 LBT Type 1, for example, the UE may consider that a specific UL resource is always valid under any condition, and transmit a UL signal, upon acquisition of a UE-initiated COT by Cat-2 LBT in the configured specific UL resource. That is, the UE may perform a CAP and transmit a UL signal in the specific UL resource, serving as an initiating device, irrespective of whether the UE has detected the specific PDCCH. In another example, in Cat-2 LBT Type 2, the UE may determine the validity of a UL resource according to whether a gNB-initiated COT has been detected and then transmit a UL signal by sharing the COT of the BS, when succeeding in Cat-2 LBT. That is, after determining whether a UL resource is valid depending on whether the specific PDCCH has been detected, the UE may transmit a UL signal by sharing the COT of the BS, upon success of Cat-2 LBT in a valid UL resource. Alternatively, with a plurality of UL resources configured, a Cat-2 LBT type to be used may be configured/indicated on a UL resource basis by an RRC signal or RMSI or whether a UL resource is located in the middle of an FFP or in alignment with the starting time of the FFP may be configured/indicated on a UL resource basis.

For a UL signal/channel transmittable without a UL grant, such as a CG-PUSCH, a periodic/semi-persistent SRS, or a periodic/semi-persistent PUCCH, the BS may pre-allocate time/frequency resources for transmission of the UL signal/channel to the UE, and the UE may perform a UL transmission in the configured resources even without a UL grant. The UE may be allocated to the resources of the UL channel/signal by a higher-layer signal such as an RRC signal, a physical-layer signal such as DCI, or both.

The UE may transmit a UL channel/signal in an FFP configured with the UL channel/signal transmission by sharing a COT of the BS. Alternatively, in the presence of time resources configured in alignment with an FFP boundary, the UE may autonomously perform Cat-2 LBT in the idle period of the previous FFP and transmit a UL channel/signal in a corresponding FFP, when determining the channel to be idle. In the former case, when the UE attempts to detect or receive the specific PDCCH from the BS in every FFP and succeeds in detecting or receiving the specific PDCCH, the UE may perform Cat-2 LBT within x ms (or x slots) and upon success of Cat-2 LBT, perform a UL transmission.

A CG-PDCCH may include a bit field that triggers a CG-PUSCH, a periodic/semi-persistent SRS, or a periodic/semi-persistent PUCCH, or the UL channel/signal may be transmitted, when a PDCCH DMRS has been successfully detected.

[Proposed method #3] FFPs may be configured separately for the BS and the UE. Specifically, an FFP of the BS and an FFP of the UE may be configured with a gap between them. In the case where the UE is configured with a UL signal/channel transmittable without a UL grant, such as a CG-PUSCH and/or a periodic/semi-persistent SRS and/or a periodic semi-persistent PUCCH, when the UE acquires a UE-initiated COT by Cat-2 LBT in its own FFP, confirming that there is no DL transmission in the FFP, the UE may transmit the configured UL channel(s)/signal(s). However, when the UE acquires a UE-initiated COT by Cat-2 LBT and constructs a UL burst with a plurality of signals/channels, a specific channel/signal may be configured/indicated as a representative channel/signal. The starting time of the representative channel/signal may be aligned with the starting time of a configured FFP. The UE may attempt LBT to the configured representative channel/signal. When succeeding in the LBT, the UE may start to transmit the representative channel/signal. After Cat-2 LBT or Cat-1 LBT, the UE may also transmit the subsequent other signals/channels according to the length of the gap between transmissions. If Cat-1 LBT is applied, a predefined or indicated/configured limit may be imposed on the transmission duration of a UL transmission subsequent to the LBT.

A lower priority may be assigned to a UL signal/channel of which the transmission may start without a UL grant, such as a CG-PUSCH and/or a periodic/semi-persistent SRS and/or a periodic/semi-persistent PUCCH, unlike a UL grant-based UL transmission than a DL transmission from the BS, so that the UL signal/channel may be transmitted in an FFP free of a DL transmission. When the FFP of the UE is configured to follow the FFP of the BS in time with a gap between them, an idle period in which LBT is performed before a UL signal transmission in the FFP of the UE is located in the middle of the FFP of the BS. Therefore, when confirming the absence of any DL transmission in the FFP, the UE may perform the UL transmission. That is, when the BS is confirmed as not using the FFP, the UE transmits the UL signal/channel transmittable without a UL grant, in preconfigured resources.

Figure 11:
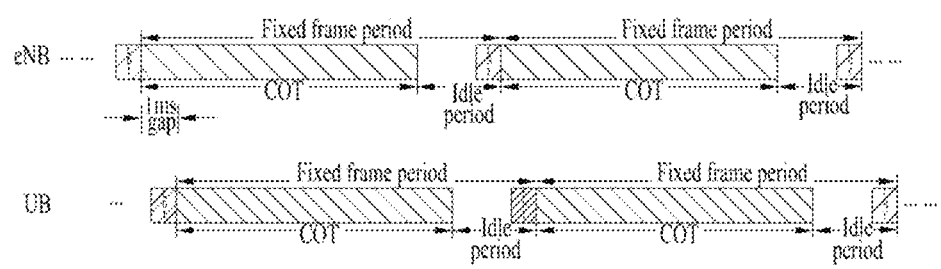

Referring to FIG. 11, when an FFP of a UE is configured to follow an FFP of a BS in time with a gap of 1ms between the FFPs, an idle period in which the UE performs LBT is located after the starting time of the FFP of the BS. Because a transmission in an FBE is allowed to start only at an FFP boundary, the UE may transmit a UL channel/signal transmittable without a UL grant, determining that success of LBT of the UE is attributed to the absence of a DL transmission from the BS in the FFP.

[Proposed method #4] On a primacy cell (PCell), the BS as an initiating device provides, to the UE, information about a channel access mode (the FBE or LBE mode), an FFP of the BS, and the starting position of the FFP, for an FBE operation by a higher-layer signal (e.g., SIB), and when adding a secondary cell (SCell) for carrier aggregation (CA), configures the channel access mode and/or FBE-related parameters of the SCell.

(1) Each time an SCell is added, information about the channel access mode and/or FBE-related information of the SCell (the channel access mode and/or an FFP and the starting position of the FFP) may be configured by a higher-layer signal, irrespective of the operation mode of the PCell.

(2) In the case where when an SCell is added, information about the channel access mode and/or FBE-related information of the SCell (the channel access mode and/or an FFP and the starting position of the FFP) is not configured by a higher-layer signal, the SCell may be operated in the same channel access mode as that of the PCell. (Particularly when the PCell is operated in the FBE mode, the SCell may be operated on the assumption that FBE-related parameters of the SCell are also identical to those of the PCell).

(3) In the case of intra-band CA and an FBE-mode PCell, an SCell may be operated in the FBE mode with the same FFP parameters as those of the PCell. In the case of inter-band CA and an FBE-mode PCell, an SCell may be operated according to a channel access mode and/or FBE-related parameters configured by a higher-layer signal, or when a channel access mode is not configured by a higher-layer signal, the SCell may be operated in the same channel access mode as that of the PCell. (Particularly when the PCell is operated in the FBE mode, the SCell may be operated on the assumption that FBE-related parameters of the SCell are also identical to those of the PCell).

(4) When FFP parameters are configured together with the channel access mode of a PCell or an SCell as the LBE mode by a higher-layer signal, the UE may perform LBT based on the configured FFP parameters, considering that the UE may operate as an initiating device. When the UE succeeds in the LBT, the UE may perform a UL transmission.

(5) In a dual connectivity situation, the above-described methods of (1) to (4) may be applied to CA between a primary secondary cell (PSCell) and an SCell or to the PSCell on the PCell.

(6) If the PCell is an L-Cell, the channel access mode and/or FFP parameters of the SCell may be configured by a higher-layer signal. When the channel access mode and/or FFP parameters of the SCell are not configured by a higher-layer signal, the UE may operate on the assumption of the LBE mode as a default mode. The CA situation is exemplary, and the channel access mode of a serving cell or a cell to be accessed by the UE may be configured by a higher-layer signal irrespective of a PCell or an SCell. However, if the channel access mode of a serving cell or a cell to be accessed by the UE is not configured by a higher-layer signal, the UE may operate on the assumption of the LBE mode. For example, when an SIB received by the UE does not include information about a channel access mode, the UE may operate in the LBE mode, considering that the serving cell/the cell to be accessed operates in the LBE mode. Specifically, when the UE operating in the LBE mode has transmission data, the UE may transmit the data based on the result of a CAP. When the UE operates in the LBE mode, the CAP may include a random backoff-based CAP (e.g., Type 1 CAP).

The above operations are all for UL operations. When a cell is added, the operations may be applied to a cell configured with a UL operation.

The BS or cell may operate in the LBE mode or the FBE mode. Information about the operation mode of the cell, that is, the channel access mode of the cell and FBE-related parameters (an FFP, the starting position of the FFP, and so on) for an FBE operation may be transmitted in a higher-layer signal such as an SIB. Further, when an SCell is added for a CA operation, the SCell may also be operated in the LBE mode or the FBE mode, and thus the channel access mode and/or FBE-related parameters of the SCell may be signaled to the UE by a higher-layer signal. Each time an SCell is added, the channel access mode and/or FBE-related parameters of the SCell may be configured for the UE by a higher-layer signals as in the method of (1). That is, although the PCell is operated in the LBE mode, when an SCell is added with its channel access mode configured as the FBE mode by a higher-layer signal, the SCell may be operated in the FBE mode based on the configured FBE-related parameters.

When an SCell is added, the channel access mode or FBE-related parameters of the SCell may not be configured by a higher-layer signal. In this case, the SCell may always be operated in the same operation mode and parameters as the channel access mode and/or FBE-related parameters of the PCell as in the method of (2). That is, when the PCell is operated in the FBE mode and an SCell is added without a configuration from a higher-layer signal, the SCell may be operated in the FBE mode with the same FBE-related parameters as those of the PCell. When the PCell is operated in the LBE mode, the SCell may also be operated in the LBE mode.

The SCell may be operated in different channel access modes in intra-band CA and inter-band CA. Specifically, the SCell may always be operated in the channel access mode and/or FBE-related parameters of the PCell in intra-band CA. In inter-band CA, the SCell may be operated differently from the PCell depending on whether the channel access mode and/or 1-BE-related parameters of the SCell are or are not configured by a higher-layer signal. In the former case, the SCell may be operated in the channel access mode configured by the higher-layer signal, whereas in the latter case, the SCell may be operated in the channel access mode of the PCell and/or with the FBE-related parameters of the PCell, similarly to in intra-band CA.

In the case where despite configuration of the LBE mode as the channel access mode of the PCell or the SCell by a higher-layer signal, FBE-related parameters (an FFP, the starting position of the FFP, and so on) are also configured as in the method of (4), the UE may perform LBT without a grant from the BS based on the configured FBE-related parameters, considering that the operation mode is the FBE mode in which the UE may serve as an initiating device. When succeeding in the LBT, the UE may perform a UL transmission.

While operations in the presence and absence of a configuration of a channel access mode and parameters required for an FBE operation in a CA situation between a PCell and an SCell have been described in the methods of (1) to (4), each method of (1) to (4) may also be applied to CA between a PCell and an SCell in a dual connectivity situation as in the method of (5).

If the PCell is an L-cell, the channel access mode and/or operation-related parameters of the SCell may be configured by a higher-layer signal. Otherwise, the SCell may be operated in the LBE mode as a default channel access mode.

[Proposed method #5] When the BS allocates CG resources to a specific CC/cell, the BS configures/indicates whether all or some of the following NR-U CG features are used for/to a UE by a higher-layer signal such as an RRC signal, a physical-layer signal such as DCI, or both.

(1) An HARQ process ID linked to a slot index is not determined. Instead, the UE selects one of HARQ process IDs configured by a CG and transmits the selected HARQ process ID.

(2) A CG-DFI is monitored to receive a feedback of the result of decoding a transmitted CG-PUSCH in the CG-DFI. In the absence of retransmission scheduling through a UL grant or a feedback such as a DFI during a configured specific time (or slot duration), the CG-PUSCH is automatically retransmitted in CG resources.

(3) Each time a CG-PUSCH is transmitted, information such as an HARQ process ID, a new data indication (NDI), and an RV is also transmitted in CG-UCI.

The above operations are also applicable when the CC/cell is operated in the FBE mode, and whether to use all or some individual ones of the features may be signaled by RRC signaling. The use or non-use of the features may be determined according to whether the UE is configured as an initiating device or a responding device in a cell/CC configured with the FBE mode.

Because LBT is involved in all transmissions and LBT failure makes transmission impossible in view of the nature of an unlicensed band, the above features slightly different from Type 1 CG and Type 2 CG of Rel-15 have been introduced to an NR-U CG. However, it may be inefficient or inappropriate to perform a CG transmission using the above NR-U features as they are according to the channel access mode of an unlicensed band, for example, in spite of operation in the unlicensed band for a CC/cell operated in the FBE mode.

Accordingly, the BS may additionally configure/indicate whether to use all or some of the NR-U CG features described above in (1), (2), and (3) for/to the UE by a higher-layer signal such as an RRC signal, a physical-layer signal such as DCI, or both, while providing the channel access mode and/or FBE-related parameters of an unlicensed CC/cell by a higher-layer signal. A CG may adopt the scheme of determining an HARQ process ID linked to a slot index for a CC/cell configured with non-use of the feature of (1), similarly to Rel-15. For a CC/cell configured with non-use of the feature of (2), the UE may not monitor a CG-DFI and, in the absence of a feedback, consider that a CG-PUSCH transmission is successful. Further, when the UE is configured/indicated not to use the feature of (3), the UE may not transmit CG-UCI each time it transmits a CG-PUSCH.

Figure 12:
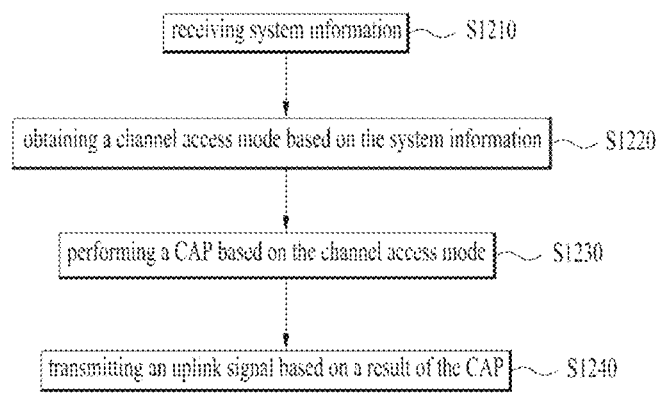
FIGS. 12 and 13 illustrate a signal transmission process according to an embodiment of the present disclosure.
Figure 13:
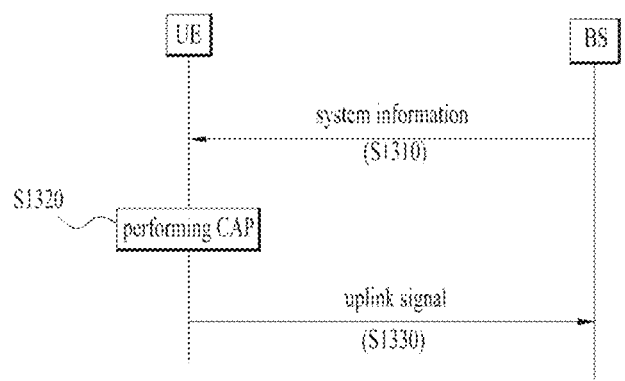

FIGS. 12 and 13 are diagrams illustrating a signal transmission process according to an embodiment of the present disclosure.

Referring to FIGS. 12 and 13, a UE receives a higher-layer signal (e.g., system information) from a BS (S1210 and S1310). The UE may acquire a channel access mode based on the system information (S1220). In an unlicensed band applicable to the present disclosure, two types of channel access modes, first and second modes may be supported. The first mode may correspond to the afore-described LBE mode, and the second mode may correspond to the afore-described FBE mode. The UE may perform a CAP based on the channel access mode (S1230 and S1320), and transmit a UL signal based on the result of the CAP (S1240 and S1330).

The UE may perform different CAP types when the UE operates in the first mode and the second mode. For example, when the UE operates in the first mode, CAP types available for the UE include a random backoff-based CAP (e.g., Cat-4). Further, when the UE operates in the first mode, the UE may perform a non-random backoff-based CAP. That is, when the UE determines a channel to be idle by performing channel sensing for a predetermined first time period, the UE may transmit a UL signal. The first time period may be, for example, 25 us or 16 us. For example, when the UE operates in the second mode, a CAP type available for the UE may be a non-random backoff-based CAP. That is, when the UE determines a channel to be idle by performing channel sensing for a predetermined second time period in the idle period of an FFP, the UE may transmit a UL signal. The second time period may be, for example, 9 us.

The UE may operate according to a channel access mode indicated by the system information. For example, when the channel access mode is indicated as the first mode by the system information, the UE may operate in the first mode. Therefore, the UE may perform one of the CAP types supported by the first mode before a UL signal transmission. When the channel access mode is indicated as the second mode by the system information, the UE may operate in the second mode. Therefore, the UE may perform a CAP according to the CAP type supported by the second mode before a UL signal transmission. When the information about a channel access mode is not included in the system information, the UE may operate in the first mode, assuming the first mode to be a default mode.

For example, the UL signal may include a PRACH of proposed method #1.

For example, the UL signal may include a UL signal (e.g., a CG-PUSCH) which does not require a UL grant, described in proposed method #3.

Unless contradicting with each other, all of the afore-described proposed methods may be implemented in combination.

The various descriptions, functions, procedures, proposals, methods, and/or operation flowcharts of the present disclosure described herein may be applied to, but not limited to, various fields requiring wireless communication/connectivity (e.g., 5G) between devices.

More specific examples will be described below with reference to the drawings. In the following drawings/description, like reference numerals denote the same or corresponding hardware blocks, software blocks, or function blocks, unless otherwise specified.

Figure 14:
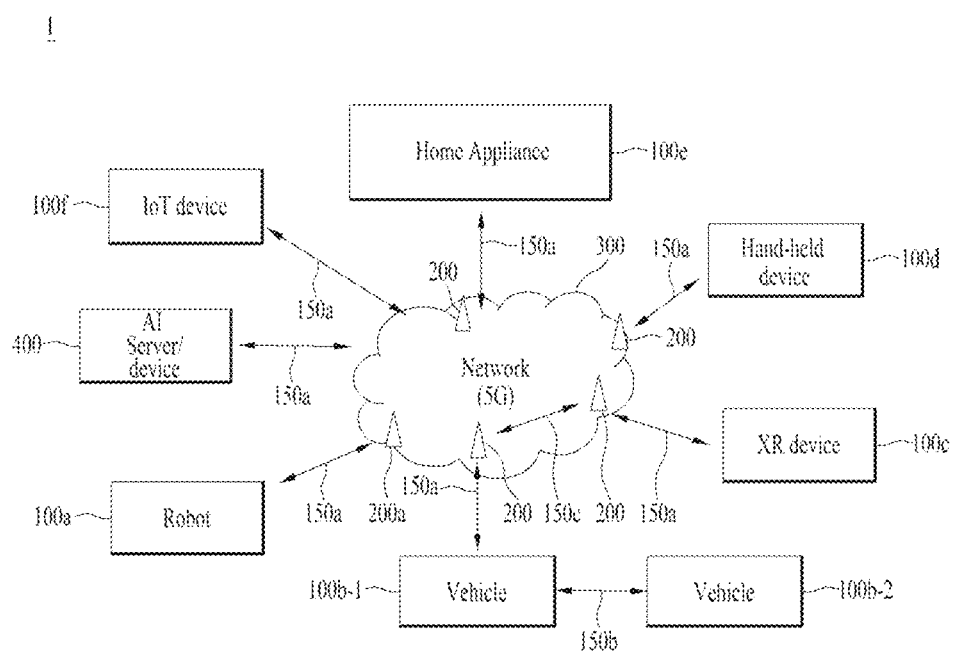
FIG. 14 illustrates an exemplary communication system applied to the present disclosure.

FIG. 14 illustrates a communication system 1 applied to the present disclosure.

Referring to FIG. 14, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smartpad, a wearable device (e.g., a smartwatch or smartglasses), and a computer (e.g., a laptop). The home appliance may include a TV, a refrigerator, a washing machine, and so on. The IoT device may include a sensor, a smartmeter, and so on. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without intervention of the BSs/network. For example, the vehicles 100b-1 and 100b-2 may perform direct communication (e.g. V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, and 150c may be established between the wireless devices 100a to 100f/BS 200 and between the BSs 200. Herein, the wireless communication/connections may be established through various RATs (e.g., 5G NR) such as UL/DL communication 150a, sidelink communication 150b (or, D2D communication), or inter-BS communication (e.g. relay or integrated access backhaul (IAB)). Wireless signals may be transmitted and received between the wireless devices, between the wireless devices and the BSs, and between the BSs through the wireless communication/connections 150a, 150b, and 150c. For example, signals may be transmitted and receive don various physical channels through the wireless communication/connections 150a, 150b and 150c. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

Figure 15:
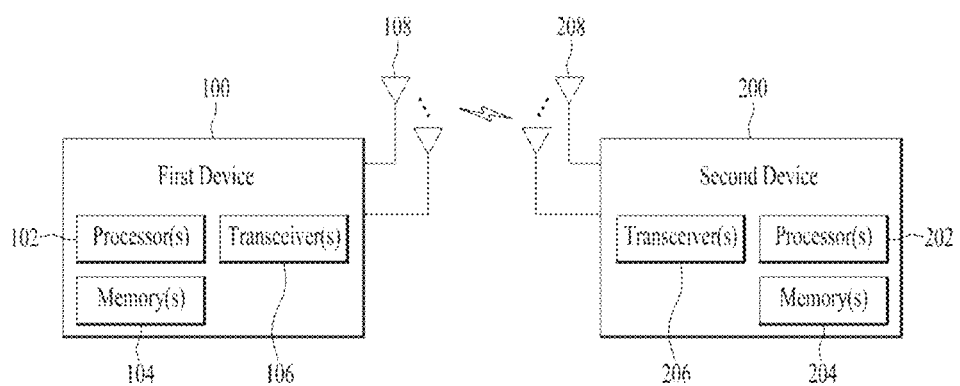
FIG. 15 illustrates an exemplary wireless device applicable to the present disclosure.

FIG. 15 illustrates wireless devices applicable to the present disclosure.

Referring to FIG. 15, a first wireless device 100 and a second wireless device 200 may transmit wireless signals through a variety of RATs (e.g., LTE and NR). {The first wireless device 100 and the second wireless device 200} may correspond to {the wireless device 100x and the BS 200} and/or {the wireless device 100x and the wireless device 100x} of FIG. 14.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

The second wireless device 200 may include one or more processors 202 and one or more memories 204, and further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 106 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals. To this end, the one or more transceivers 106 and 206 may include (analog) oscillators and/or filters.

Figure 16:
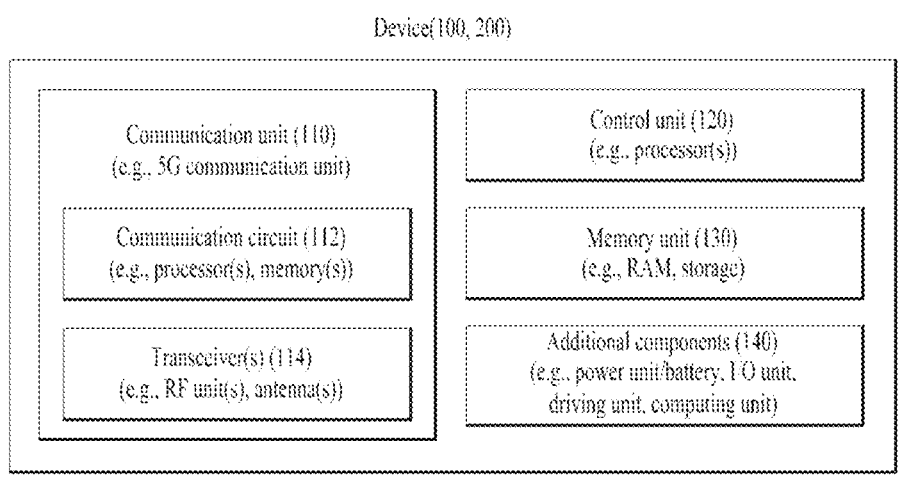
FIG. 16 illustrates another exemplary wireless device applicable to the present disclosure.

FIG. 16 illustrates another example of a wireless device applied to the present disclosure. The wireless device may be implemented in various forms according to a use case/service (refer to FIG. 14).

Referring to FIG. 16, wireless devices 100 and 200 may correspond to the wireless devices 100 and 200 of FIG. 14 and may be configured to include various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 and/or the one or more memories 104 and 204 of FIG. 15. For example, the transceiver(s) 114 may include the one or more transceivers 106 and 206 and/or the one or more antennas 108 and 208 of FIG. 15. The control unit 120 is electrically connected to the communication unit 110, the memory 130, and the additional components 140 and provides overall control to the wireless device. For example, the control unit 120 may control an electric/mechanical operation of the wireless device based on programs/code/instructions/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to type of the wireless device. For example, the additional components 140 may include at least one of a power unit/battery, input/output (I/O) unit, a driving unit, and a computing unit. The wireless device may be implemented in the form of, not limited to, the robot (100a of FIG. 14), the vehicles (100b-1 and 100b-2 of FIG. 14), the XR device (100c of FIG. 14), the hand-held device (100d of FIG. 14), the home appliance (100e of FIG. 14), the IoT device (100f of FIG. 14), a digital broadcasting terminal, a hologram device, a public safety device, an MTC device, a medical device, a FinTech device (or a finance device), a security device, a climate/environment device, the AI server/device (400 of FIG. 14), the BSs (200 of FIG. 14), a network node, or the like. The wireless device may be mobile or fixed according to a use case/service.

In FIG. 16, all of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module in the wireless devices 100 and 200 may further include one or more elements. For example, the control unit 120 may be configured with a set of one or more processors. For example, the control unit 120 may be configured with a set of a communication control processor, an application processor, an electronic control unit (ECU), a graphical processing unit, and a memory control processor. In another example, the memory 130 may be configured with a RAM, a dynamic RAM (DRAM), a ROM, a flash memory, a volatile memory, a non-volatile memory, and/or a combination thereof.

Figure 17:
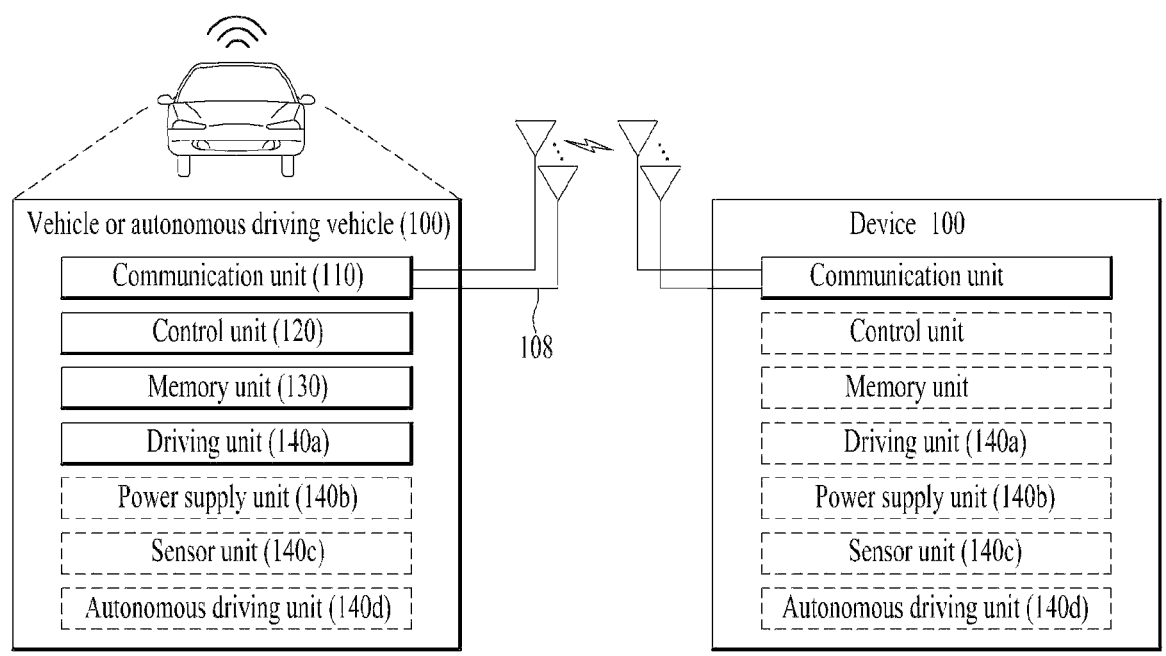
FIG. 17 illustrates an exemplary vehicle or autonomous driving vehicle applicable to the present disclosure.

FIG. 17 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 17, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 16, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may enable the vehicle or the autonomous driving vehicle 100 to drive on a road. The driving unit 140a may include an engine, a motor, a powertrain, a wheel, a brake, a steering device, and so on. The power supply unit 140b may supply power to the vehicle or the autonomous driving vehicle 100 and include a wired/wireless charging circuit, a battery, and so on. The sensor unit 140c may acquire information about a vehicle state, ambient environment information, user information, and so on. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140d may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140d may generate an autonomous driving route and a driving plan from the obtained data. The control unit 120 may control the driving unit 140a such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140c may obtain information about a vehicle state and/or surrounding environment information. The autonomous driving unit 140d may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

The embodiments of the present disclosure described above are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by a subsequent amendment after the application is filed.

The embodiments of the present disclosure have been described above, focusing on the signal transmission and reception relationship between a UE and a BS. The signal transmission and reception relationship is extended to signal transmission and reception between a UE and a relay or between a BS and a relay in the same manner or a similar manner A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term BS may be replaced with the term fixed station, Node B, enhanced Node B (eNode B or eNB), access point, and so on. Further, the term UE may be replaced with the term terminal, mobile station (MS), mobile subscriber station (MSS), and so on.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The present disclosure may be used in a UE, a BS, or other devices in a mobile communication system.

The invention claimed is:

1. A method of a user equipment (UE) in a wireless communication system, the method comprising:
receiving, from a base station (BS), system information,
wherein:
when (i) the system information includes information related to a first channel access mode or (ii) the system information does not include information related to any channel access mode:
performing a first channel access procedure (CAP) based on the first channel access mode; and
performing, to the BS, a configured uplink (UL) transmission based on a first channel corresponding to the first CAP being sensed to be idle; and
when (i) the system information includes information related to a second channel access mode different from the first channel access mode and (ii) the UE determines that the BS has not initiated a channel occupancy in a frame based first period of the BS:
performing a second CAP in a frame based second period of the UE based on the second channel access mode; and
performing, to the BS, the configured UL transmission in the frame based second period based on a second channel corresponding to the second CAP being sensed to be idle.

2. The method according to claim 1, wherein the first channel access mode is based on a random backoff-based CAP.

3. The method according to claim 1, wherein the second channel access mode is a mode in which the CAP and the configured UL transmission are performed in the frame based second period, and
wherein the frame based second period is repeated, periodically.

4. The method according to claim 1, wherein the configured UL transmission is performed in an unlicensed band.

5. A user equipment (UE) configured to operate in a wireless communication system, the UE comprising:
at least one transceiver;
at least one processor; and
at least one computer memory operatively coupled to the at least one transceiver and at least one processor and, when executed, causing the at least one transceiver and at least one processor to perform operations comprising:
receiving, through the at least one transceiver from a base station (BS), system information,
wherein:
when (i) the system information includes information related to a first channel access mode or (ii) the system information does not include information related to any channel access mode:
performing a first channel access procedure (CAP) based on the first channel access mode; and
performing, through the at least one transceiver to the BS, a configured uplink (UL) transmission based on a first channel corresponding to the first CAP being sensed to be idle; and
when (i) the system information includes information related to a second channel access mode different from the first channel access mode and (ii) the UE determines that the BS has not initiated a channel occupancy in a frame based first period of the BS:
performing a second CAP in a frame based second period of the UE based on the second channel access mode; and
performing, through the at least one transceiver to the BS, the configured UL transmission in the frame based second period based on a second channel corresponding to the second CAP being sensed to be idle.

6. The UE according to claim 5, wherein the first channel access mode is based on a random backoff-based CAP.

7. The UE according to claim 5, wherein the second channel access mode is a mode in which the CAP and the configured UL transmission are performed in the frame based second period, and
wherein the frame based second period is repeated, periodically.

8. The UE according to claim 5, wherein the UE includes an autonomous driving vehicle communicable with at least one of a network or another autonomous driving vehicle other than the UE.

9. An apparatus for a user equipment (UE), the apparatus comprising:
- at least one processor; and
- at least one computer memory operatively coupled to the at least one processor and, when executed, causing the at least one processor to perform operations comprising:
  - receiving, from a base station (BS), system information,
  - wherein:

when (i) the system information includes information related to a first channel access mode or (ii) the system information does not include information related to a any channel access mode:
- performing a first channel access procedure (CAP) based on the first channel access mode; and
- performing, to the BS, a configured uplink (UL) transmission based on a first channel corresponding to the first CAP being sensed to be idle; and when (i) the system information includes information related to a second channel access mode different from the first channel access mode and (ii) the UE determines that the BS has not initiated a channel occupancy in a frame based first period of the BS:
- performing a second CAP in a frame based second period of the UE based on the second channel access mode; and
- performing, to the BS, the configured UL transmission in the frame based second period based on a second channel corresponding to the second CAP being sensed to be idle.

10. The method according to claim 1, wherein the UE determines that the BS has not initiated the channel occupancy in the frame based first period based on a downlink (DL) transmission not being detected in the frame based first period.

\* \* \* \* \*